US012693402B2

(12) United States Patent
Manela et al.

(10) Patent No.: US 12,693,402 B2
(45) Date of Patent: Jul. 28, 2026

(54) MULTI-AXIS RADAR VELOCITY IMAGE FROM STEREO DOPPLER RADAR

(71) Applicant: Waymo LLC, Mountain View, CA (US)

(72) Inventors: Joshua Max Manela, Mountain View, CA (US); Nicholas Lloyd Armstrong-Crews, San Jose, CA (US); Matthew Evan Thrasher, Ann Arbor, MI (US)

(73) Assignee: Waymo LLC, Mountain View, CA (US)

( * ) Notice: Subject to any disclaimer, the term of this patent is extended or adjusted under 35 U.S.C. 154(b) by 318 days.

(21) Appl. No.: 18/479,376

(22) Filed: Oct. 2, 2023

(65) Prior Publication Data

US 2025/0110230 A1     Apr. 3, 2025

(51) Int. Cl.
| | |
|---|---|
| *G01S 13/58* | (2006.01) |
| *G01S 7/41* | (2006.01) |
| *G01S 13/89* | (2006.01) |
| *G01S 13/931* | (2020.01) |

(52) U.S. Cl.
CPC ............ *G01S 13/581* (2013.01); *G01S 7/417* (2013.01); *G01S 13/89* (2013.01); *G01S 13/931* (2013.01)

(58) Field of Classification Search
CPC ........ G01S 13/581; G01S 7/417; G01S 13/89; G01S 13/931; G01S 7/415; G01S 13/582; G01S 13/589; G01S 13/227; G01S 13/865; G01S 13/867; G01S 13/87; G01S 2013/9315; G01S 2013/93185; G01S 2013/9319; G01S 2013/93271; G01S 2013/9327
See application file for complete search history.

(56) References Cited

U.S. PATENT DOCUMENTS

| | | | | |
|---|---|---|---|---|
| 5,247,303 | A | * | 9/1993 | Cornelius ............... G01S 7/417 342/84 |
| 10,628,686 | B2 | * | 4/2020 | Ogale .................... G06V 20/58 |
| 11,907,829 | B2 | * | 2/2024 | Meissner ................ G01S 7/417 |
| 2019/0187267 | A1 | * | 6/2019 | Li .......................... G01S 13/931 |
| 2021/0241026 | A1 | * | 8/2021 | Deng ...................... G01S 7/497 |

(Continued)

FOREIGN PATENT DOCUMENTS

| | | | | |
|---|---|---|---|---|
| DE | 102021105659 | A1 | * 6/2022 | ........... G01S 13/931 |

OTHER PUBLICATIONS

DE_102021105659_A1_I_translate.pdf (Year: 2022).*

*Primary Examiner* — Yonghong Li
(74) *Attorney, Agent, or Firm* — McDonnell Boehnen Hulbert & Berghoff LLP

(57)     ABSTRACT

Example embodiments relate techniques and systems for generating multi-axis radar velocity images using stereo radar. A vehicle radar system receives radar first radar data from a first radar and second radar data from a second radar, which are coupled at different locations on a vehicle traveling in an environment. The system determines a first radial speed and a second radial speed for an object based on the first and second radar data, respectively, and then estimates a velocity vector for the object relative to the vehicle based on the first and second radial speeds. The system can provide the estimated velocity vector as an input into a neural network and enable vehicle systems to control the vehicle based on the output from the neural network.

20 Claims, 19 Drawing Sheets

(56)         References Cited

U.S. PATENT DOCUMENTS

| | | | |
|---|---|---|---|
| 2022/0342039 A1* | 10/2022 | Eschbaumer | G01S 7/415 |
| 2023/0003872 A1* | 1/2023 | Qian | G01S 13/723 |
| 2023/0314588 A1* | 10/2023 | Hoffmann | G01S 13/878 |
| | | | 342/59 |
| 2023/0333252 A1* | 10/2023 | Pazhayampallil | B60W 30/146 |

* cited by examiner

260

210

208

204A

204B

202

206

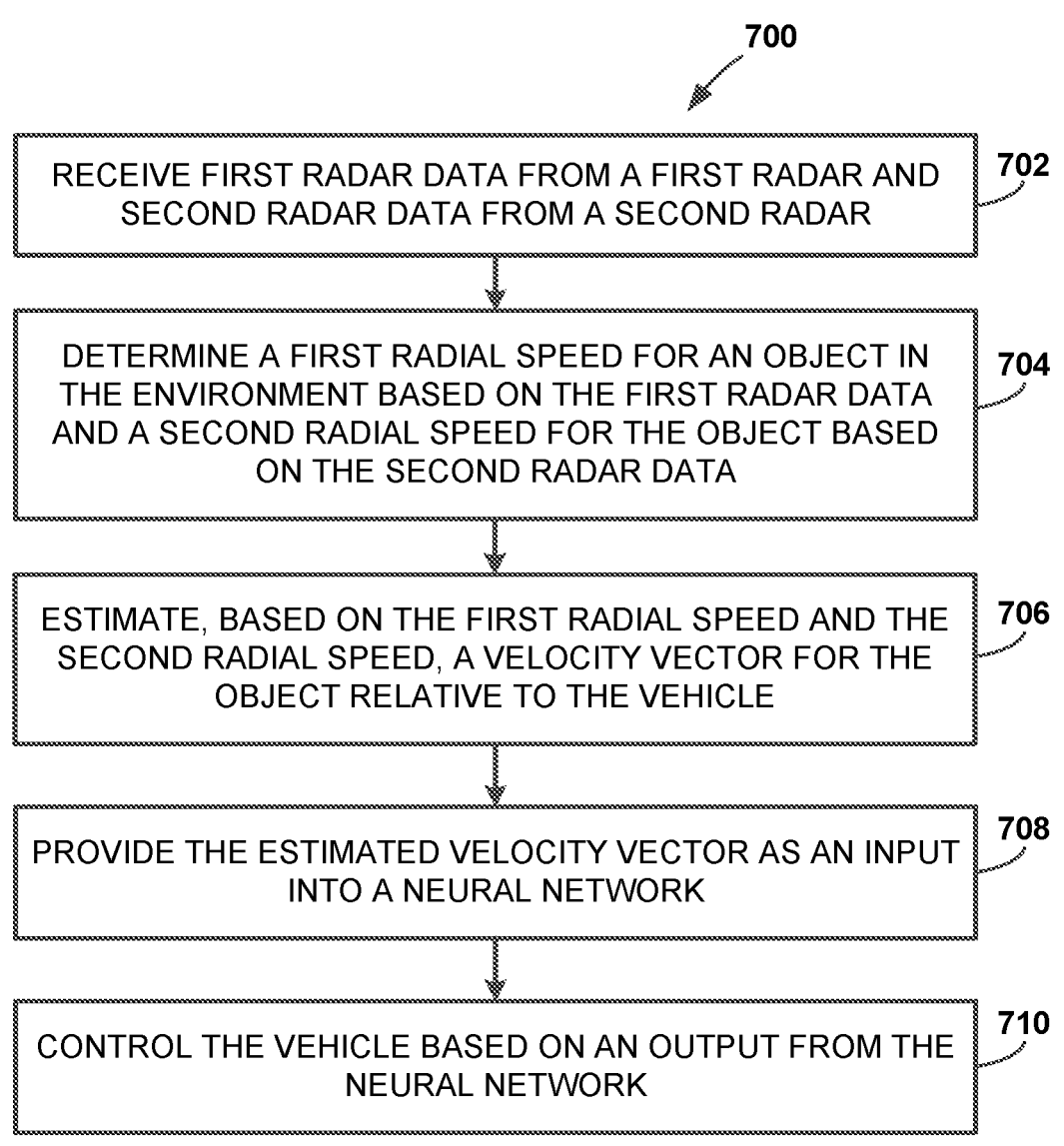

700

RECEIVE FIRST RADAR DATA FROM A FIRST RADAR AND SECOND RADAR DATA FROM A SECOND RADAR          702

DETERMINE A FIRST RADIAL SPEED FOR AN OBJECT IN THE ENVIRONMENT BASED ON THE FIRST RADAR DATA AND A SECOND RADIAL SPEED FOR THE OBJECT BASED ON THE SECOND RADAR DATA          704

ESTIMATE, BASED ON THE FIRST RADIAL SPEED AND THE SECOND RADIAL SPEED, A VELOCITY VECTOR FOR THE OBJECT RELATIVE TO THE VEHICLE          706

PROVIDE THE ESTIMATED VELOCITY VECTOR AS AN INPUT INTO A NEURAL NETWORK          708

CONTROL THE VEHICLE BASED ON AN OUTPUT FROM THE NEURAL NETWORK          710

FIG. 7

MULTI-AXIS RADAR VELOCITY IMAGE FROM STEREO DOPPLER RADAR

BACKGROUND

Automotive radar involves using radio waves to detect the presence, distance, direction, and speed of objects in the surrounding environment of a vehicle. The vehicle radar system emits a radio signal from a transmitter, which then bounces off nearby objects and returns to a receiver. By analyzing the characteristics of the returned signal, the vehicle radar system can determine the location, speed, and direction of objects located in the environment, such as other vehicles, pedestrians, road boundaries, and obstacles. In some cases, radar data is used by a vehicle's advanced driver assistance systems (ADAS) to provide warnings to the driver or even take autonomous actions to avoid collisions. In other cases, a vehicle control system uses radar data when determining a control strategy for autonomous navigation by the vehicle.

SUMMARY

Example embodiments relate to techniques and systems for generating multi-axis radar velocity images using stereo radar. By using radar data obtained by multiple radars, a vehicle radar system can determine and input velocity vector data for nearby objects into one or multiple neural networks operating onboard the vehicle. The neural networks can use the velocity vector data for object detection and to estimate additional attributes for each object, such as a pose, a classification, and an intent for each object.

In one aspect, a method is described. The method involves receiving, at a computing system, first radar data from a first radar and second radar data from a second radar. The first radar and the second radar are coupled at different locations on a vehicle traveling in an environment. The method also involves determining a first radial speed for an object in the environment based on the first radar data and a second radial speed for the object based on the second radar data and estimating, based on the first radial speed and the second radial speed, a velocity vector for the object relative to the vehicle. The method further involves providing the estimated velocity vector as an input into a neural network and controlling the vehicle based on an output from the neural network.

In another aspect, a system is described. The system includes a vehicle, a first radar and a second radar. The first radar and the second radar are coupled at different locations on the vehicle. The system also includes a computing device, which is configured to receive first radar data from a first radar and second radar data from a second radar and determine a first radial speed for an object in the environment based on the first radar data and a second radial speed for the object based on the second radar data. The system is also configured to estimate, based on the first radial speed and the second radial speed, a velocity vector for the object relative to the vehicle, provide the estimated velocity vector as an input into a neural network, and control the vehicle based on an output from the neural network.

In yet another aspect, a non-transitory computer-readable medium is described. The non-transitory computer-readable medium is configured to store instructions, that when executed by a computing system, causes the computing system to perform operations. The operations involve receiving first radar data from a first radar and second radar data from a second radar. The first radar and the second radar are coupled at different locations on a vehicle traveling in an environment. The operations also involve determining a first radial speed for an object in the environment based on the first radar data and a second radial speed for the object based on the second radar data and estimating, based on the first radial speed and the second radial speed, a velocity vector for the object relative to the vehicle. The operations further involve providing the estimated velocity vector as an input into a neural network and controlling the vehicle based on an output from the neural network.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 7 is a flowchart of a method for generating multi-axis radar velocity images using stereo radar, according to example embodiments.

DETAILED DESCRIPTION

Figure 1:
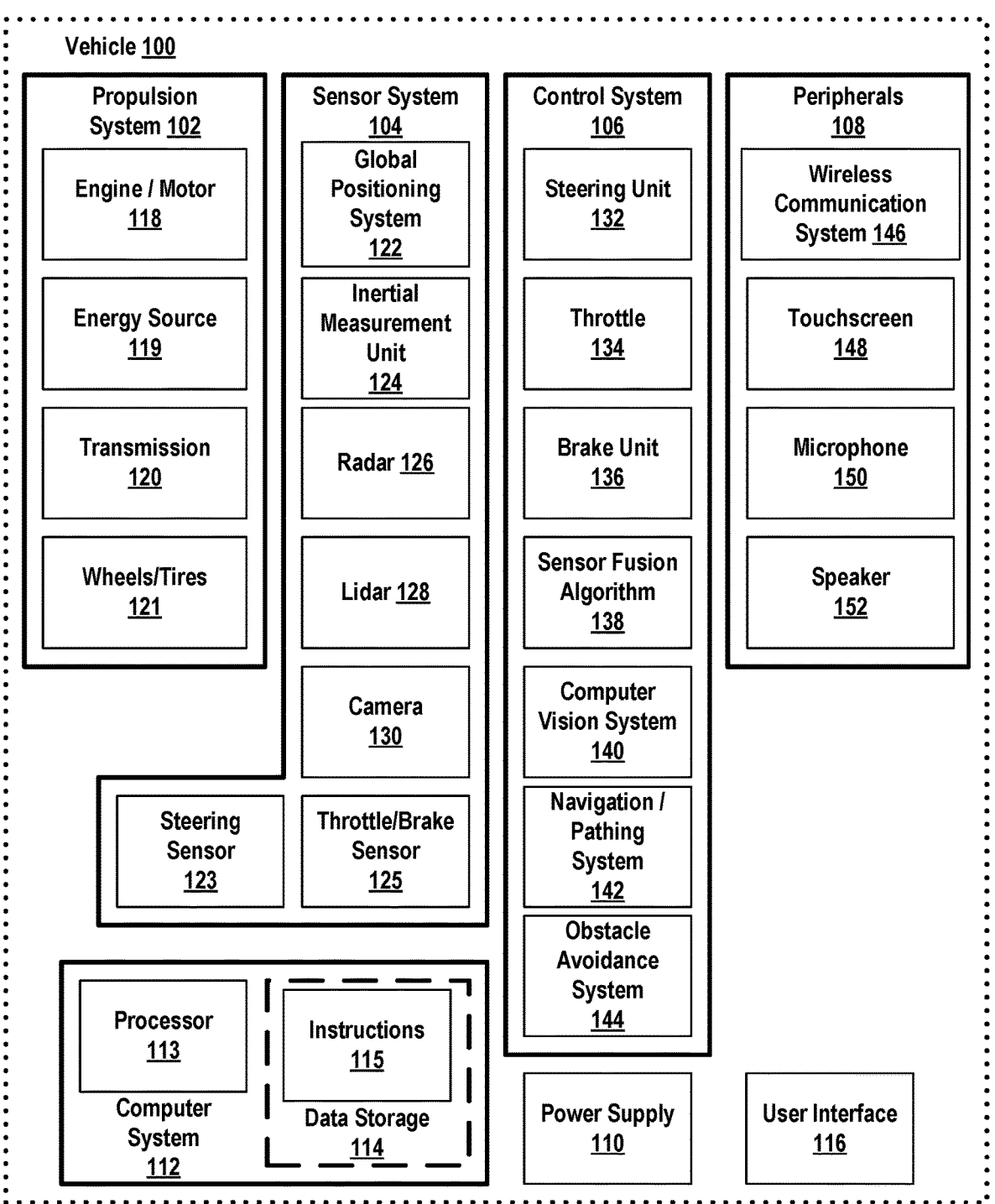
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Vehicle radar is often used on modern vehicles to enhance safety and driving assistance by providing valuable information about the surrounding environment, including radial speed measurements of objects located in the vicinity of the vehicle. In particular, a vehicle radar obtains radial speed measurements of an object due to the Doppler Effect, which is the phenomenon where the frequency of waves changes when a source and an observer are in relative motion. After the vehicle radar emits radio frequency (RF) waves in the form of pulses, these waves encounter objects in the environment and reflect back towards the radar receiver, thereby providing measurements of road boundaries, pedestrians, other vehicles, buildings, traffic cones, and other surfaces located nearby the vehicle radar during navigation. When an object is stationary, the frequency of the reflected waves remains unchanged from the emitted waves. If the object is moving, however, the frequency of the reflected waves shifts due to the Doppler Effect with an object moving towards the vehicle radar producing an increase in the frequency (positive radial speed for the object) and an object moving away from the vehicle radar producing a decrease in frequency (negative radial speed). By analyzing the frequency shift between emitted and received waves, the radar system or another processing system is able to calculate the radial speed of the objects relative to the vehicle, which can be used by vehicle systems when determining control instructions for the vehicle.

While radial speed measurements obtained from by the vehicle radar provide valuable information about the motion of objects relative to the vehicle, the radial speed data only offers a limited picture overall. More specifically, radial speed measurements only represent the speed of an object along the line-of-sight of the vehicle radar capturing the measurements, which conveys whether the object is approaching or moving away from the vehicle radar. The radial speed measurements fail to provide lateral (i.e., side-to-side) movement data for the object making it challenging for vehicle systems to accurately predict an object's trajectory and anticipate the object's intent for anticipating potential collision paths. As such, using radar to only capture radial speed measurements does not produce a comprehensive understanding of an object's position in three-dimensional (3D) space, which can making determining navigation strategies in complex traffic scenarios more difficult.

In addition, ambiguities in radial speed measurements can arise in some situations. For instance, if multiple objects are moving at different radial speeds along the same line-of-sight, the radar system might fail to accurately distinguish between the objects and diminish the radar system's ability to correctly track the objects. Radial speed measurements are also less effective when the radar system is trying to determine if multiple objects in the environment have crossing path trajectories and when radar data is used to detect and identify stationary objects. In some cases, radial speed measurements from a single vehicle radar might not provide measurements that can enable vehicle systems to efficiently detect stalled vehicles or nearby pedestrians that are standing still.

Example embodiments presented herein relate to techniques and systems for using stereo radars to generate multi-axis radar velocity images, which can be used by onboard computing systems to detect and determine information about nearby objects, such as lateral movement, position, intent and orientation of the objects. By using radar measurements from radars that are positioned at different locations on a vehicle but with partially overlapping field of views, the vehicle radar system can estimate velocity vector data for surfaces in the environment and feed the velocity vector data into one or multiple neural networks trained to use the data to detect objects and determine various attributes about the detected objects. In some examples, the neural network or networks use the velocity vector data and other radar measurements (e.g., intensity) to predict near-term intent for objects based on recent movements as well as other attributes for each object, such as pose, orientation, classification, and size.

An example technique can be performed by the vehicle radar system or another computing system located onboard the vehicle and involves using multiple imaging radars and deep learning to fuse the per-pixel velocity information obtained from the radars before the initial object detection occurs. The technique allows the radar data to be used in object detection, which differs from classical methods that typically use multiple radars to track a previously detected object with the assistance of a Kalman filter (or a similar filter) that fuses measurements from different sensors located onboard the vehicle. As such, disclosed techniques allow vehicle systems to detect objects quicker and more reliably since the per-pixel velocity data obtained from multiple radars can be used directly by neural networks to perform object detection as the objects enter into the environment of the vehicle and without reliance on a Kalman filter.

In addition, disclosed techniques also allow the vehicle radar system to avoid data association problems that can arise between pixels of the first and second radar images by using frequency-division multiplexing and/or other mitigation techniques that enable multiple radars on the vehicle to image the scene simultaneously. For instance, the radar system can use frequency separation to differentiate returns for radars by assigning different frequency bands to each radar. Similarly, polarization diversity, time division, and variance in wave form designs are other techniques that the vehicle radar system can use to distinguish radar returns for each individual radar. The vehicle radar system can also disambiguate range rate aliases (due to a limited Doppler swath) at the pixel level when the radars use different waveforms with different pulse repetition frequencies.

By way of another example, a vehicle radar system or another processing system can receive and use radar data from multiple radars that are located at different positions on a vehicle to determine radial speeds for an object. The radial speeds can be used to subsequently estimate a velocity vector for the object relative to the vehicle. For instance, the radar system uses the extrinsic transform between the multiple radars (which can be pre-calibrated) to align the pixels of both radar images generated by the radars into a common coordinate frame, such as a vehicle frame used by the vehicle systems. The velocity vector data can then be provided as an input into one or multiple neural networks, which can detect and output information about the object, such as a classification, an orientation, a position, and a size of the object relative to the vehicle. For instance, the neural networks can use the 2D radar imagery containing the velocity vector data to detect and assign attributes to nearby objects, which can be factored into the control strategy for the vehicle.

In some examples, a neural network may use the stereo radar data for autonomous navigation by a vehicle through a multi-step process. Initially, the vehicle radar system captures reflected radio waves from objects in the environment, which provides information about their distance, relative speed, and angle from multiple perspectives. In some cases, the vehicle radar systems preprocesses the radar data by converting the raw signals into structured input suitable for the neural network. Subsequently, the neural network (e.g., a Recurrent Neural Network (RNN) or a combination of CNN and RNN) may process this data in order to recognize patterns and relationships in the radar echoes, which enables the neural network to identify obstacles, vehicles, pedestrians, and road conditions, among other aspects of the surrounding environment. By training on a diverse dataset that includes various driving scenarios and conditions, the neural network can adapt to different environments and learns to make accurate predictions about the surrounding objects' positions and dynamics. The predictions produced by the neural network can be used by vehicle control systems to make real-time decisions, such as adjusting speed, changing lanes, or applying brakes, in order to enable safe and effective navigation.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, and tractor trailers), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, and brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., single-photon avalanche diodes (SPADs)). Further, such photodetectors can be arranged (e.g., through an electrical connection in series) into an array (e.g., as in a silicon photomultiplier (SiPM)). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, and a night vision camera) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve and a carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in the navigation of vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, or one or more machine-learned models) operable to process and analyze images in an effort to determine objects that are in motion (e.g., other vehicles, pedestrians, bicyclists, or animals) and objects that are not in motion (e.g., traffic lights, roadway boundaries, speed-bumps, or potholes). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150 (e.g., one or more interior and/or exterior microphones), and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include processor 113 (which could include at least one microprocessor) operable to execute instructions 115 stored in a non-transitory, computer-readable medium, such as data storage 114. As such, processor 113 can represent one or multiple processors. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, or control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices).

Vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras), one or more lidars, one or more radars, one or more inertial sensors, one or more humidity sensors, one or more acoustic sensors (e.g., microphones and sonar devices), or one or more other sensors configured to sense information about an environment that is surrounding vehicle 200. In other words, any sensor system now known or later created could be coupled to vehicle 200 and/or could be utilized in conjunction with various operations of vehicle 200. As an example, a lidar could be utilized in self-driving or other types of navigation, planning, perception, and/or mapping operations of vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; or one or more lidars, cameras, and radars).

Note that the number, location, and type of sensor systems (e.g., 202 and 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, or to adapt to specialized environmental or application circumstances). For example, the sensor systems (e.g., 202 and 204) could be disposed of in various other locations on the vehicle and could have fields of view that correspond to internal and/or surrounding environments of vehicle 200.

The sensor system 202 may be mounted atop vehicle 200 and may include one or more sensors configured to detect information about an environment that is surrounding vehicle 200, and output indications of the information. For example, sensor system 202 can include any combination of cameras, radars, lidars, inertial sensors, humidity sensors, and acoustic sensors (e.g., microphones and sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of sensor systems 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar devices. For example, the lidar devices could include a plurality of light-emitter devices arranged over a range of angles with respect to a given plane (e.g., the x-y plane). For example, one or more of sensor systems 202, 204, 206, 208, 210, 212, 214, and/or 218 may be configured to rotate or pivot about an axis (e.g., the z-axis) perpendicular to the given plane so as to illuminate an environment that is surrounding vehicle 200 with light pulses. Based on detecting various aspects of reflected light pulses (e.g., the elapsed time of flight, polarization, and intensity), information about the surrounding environment may be determined.

In an example embodiment, sensor systems 202, 204, 206, 208, 210, 212, 214, and/or 218 may be configured to provide respective point cloud information that may relate to physical objects within the surrounding environment of vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of vehicle 200. For example, one or more sensor systems 202, 204, 206, 208, 210, 212, 214, and/or 218 could include one or more radars. In some examples, one or more radars can be located near the rear of vehicle 200 (e.g., sensor systems 208 and 210), to actively scan the environment near the back of vehicle 200 for the presence of radio-reflective objects. Similarly, one or more radars can be located near the front of vehicle 200 (e.g., sensor systems 212 or 214) to actively scan the environment near the front of vehicle 200. A radar can be situated, for example, in a location suitable to illuminate a region including a forward-moving path of vehicle 200 without occlusion by other features of vehicle 200. For example, a radar can be embedded in and/or mounted in or near the front bumper, front headlights, cowl, and/or hood, etc. Furthermore, one or more additional radars can be located to actively scan the side and/or rear of vehicle 200 for the presence of radio-reflective objects, such as by including such devices in or near the rear bumper, side panels, rocker panels, and/or undercarriage, etc.

Vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, vehicle 200 can determine the distance to the points on the object. The predetermined light pattern may comprise infrared light, or radiation at other suitable wavelengths for such measurements. In some examples, the camera can be mounted inside the front windshield of vehicle 200. Specifically, the camera can be situated to capture images from a forward-looking view with respect to the orientation of vehicle 200. Other mounting locations and viewing angles of the camera can also be used, either inside or outside vehicle 200. Further, the camera can have associated optics operable to provide an adjustable field of view. Still further, the camera can be mounted to vehicle 200 with a movable mount to vary a pointing angle of the camera, such as via a pan/tilt mechanism.

Vehicle 200 may also include one or more acoustic sensors (e.g., one or more of sensor systems 202, 204, 206, 208, 210, 212, 214, 216, 218 may include one or more acoustic sensors) used to sense a surrounding environment of vehicle 200. Acoustic sensors may include microphones (e.g., piezoelectric microphones, condenser microphones, ribbon microphones, or microelectromechanical systems (MEMS) microphones) used to sense acoustic waves (i.e., pressure differentials) in a fluid (e.g., air) of the environment that is surrounding vehicle 200. Such acoustic sensors may be used to identify sounds in the surrounding environment (e.g., sirens, human speech, animal sounds, or alarms) upon which control strategy for vehicle 200 may be based. For example, if the acoustic sensor detects a siren (e.g., an ambulatory siren or a fire engine siren), vehicle 200 may slow down and/or navigate to the edge of a roadway.

Although not shown in FIGS. 2A-2E, vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

Vehicle 200 may include one or more other components in addition to or instead of those shown. The additional components may include electrical or mechanical functionality.

A control system of vehicle 200 may be configured to control vehicle 200 in accordance with a control strategy from among multiple possible control strategies. The control system may be configured to receive information from sensors coupled to vehicle 200 (on or off vehicle 200), modify the control strategy (and an associated driving behavior) based on the information, and control vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
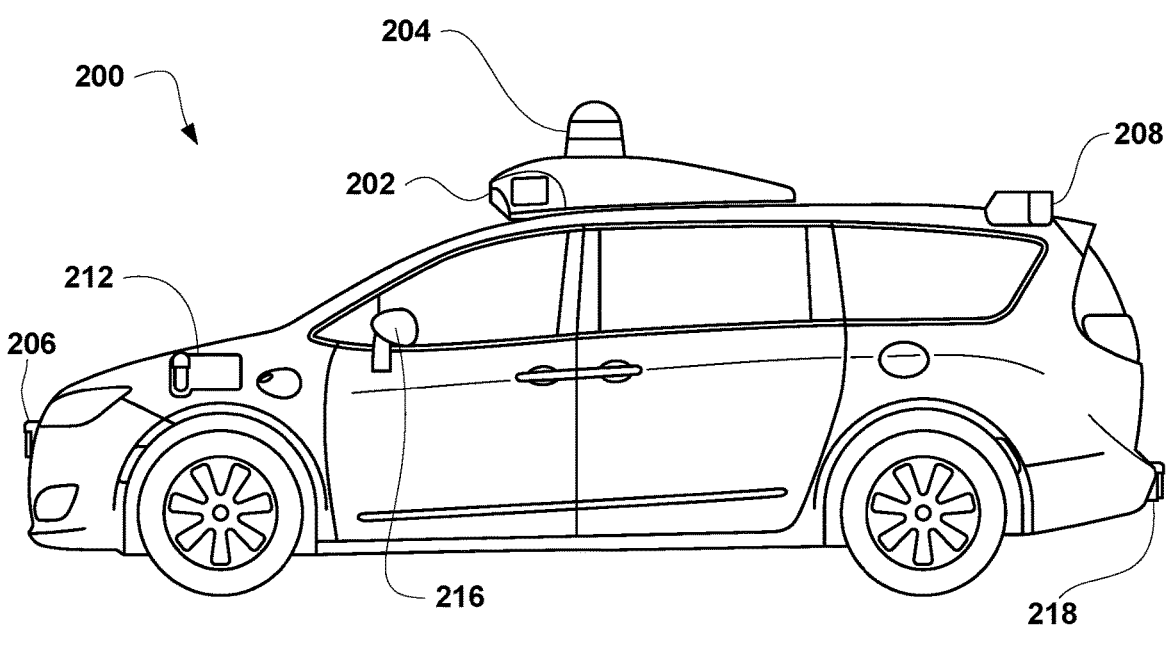
FIG. 2A is an illustration of a physical configuration of a vehicle, according to example embodiments.
Figure 2B:
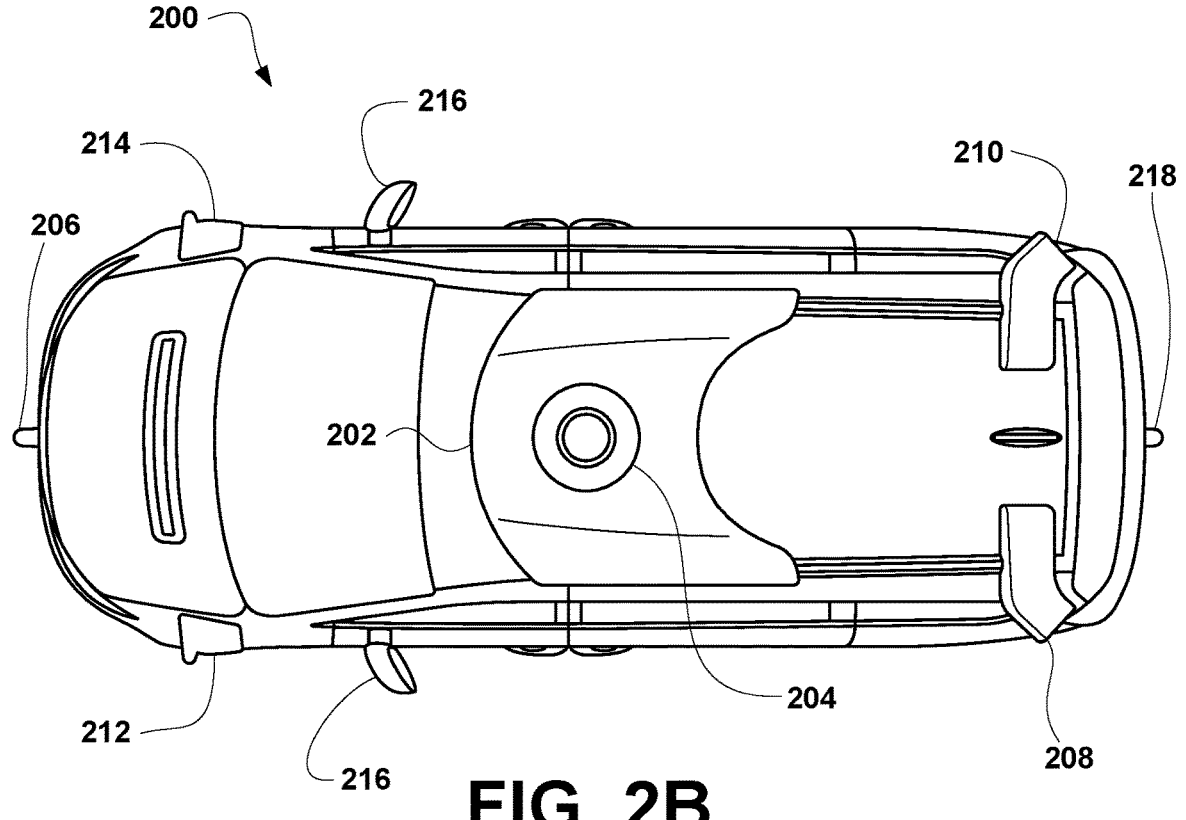
FIG. 2B is an illustration of a physical configuration of a vehicle, according to example embodiments.
Figure 2C:
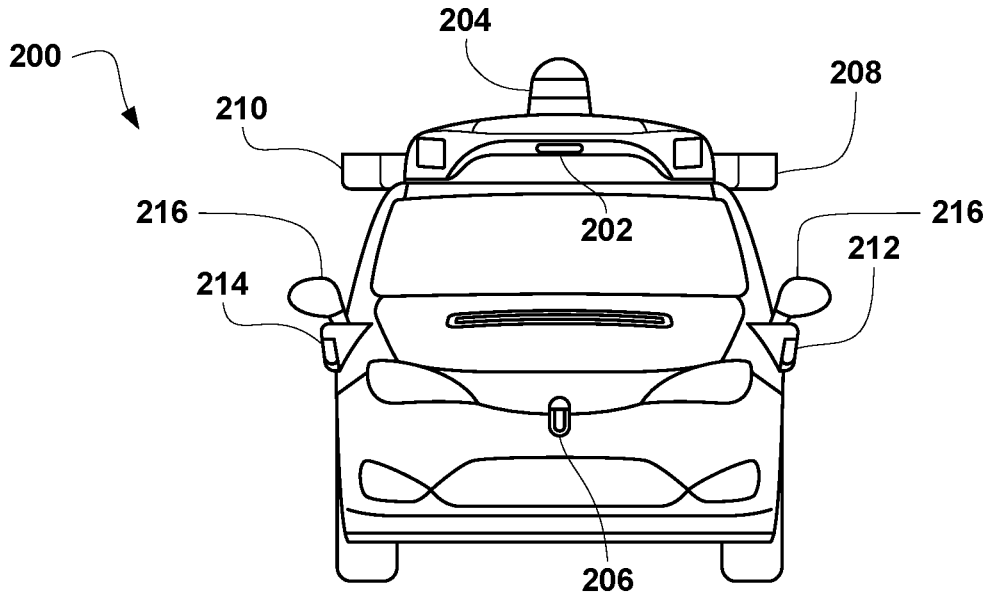
FIG. 2C is an illustration of a physical configuration of a vehicle, according to example embodiments.
Figure 2D:
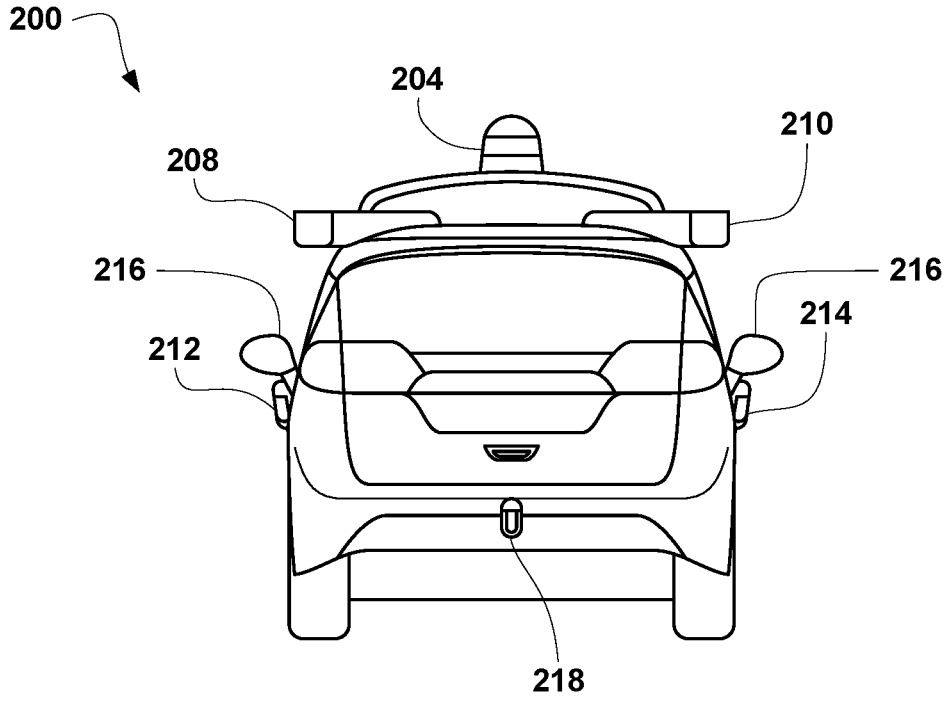
FIG. 2D is an illustration of a physical configuration of a vehicle, according to example embodiments.
Figure 2E:
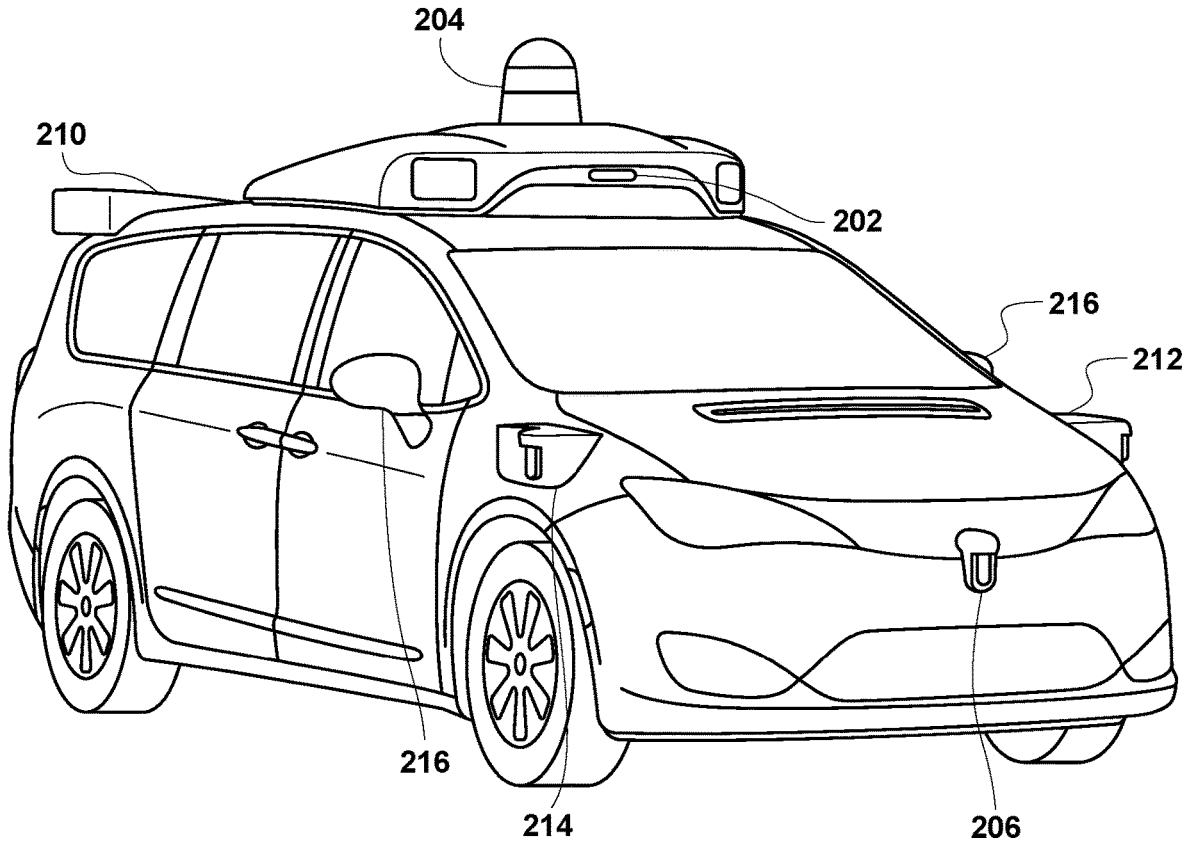
FIG. 2E is an illustration of a physical configuration of a vehicle, according to example embodiments.
Figure 2F:
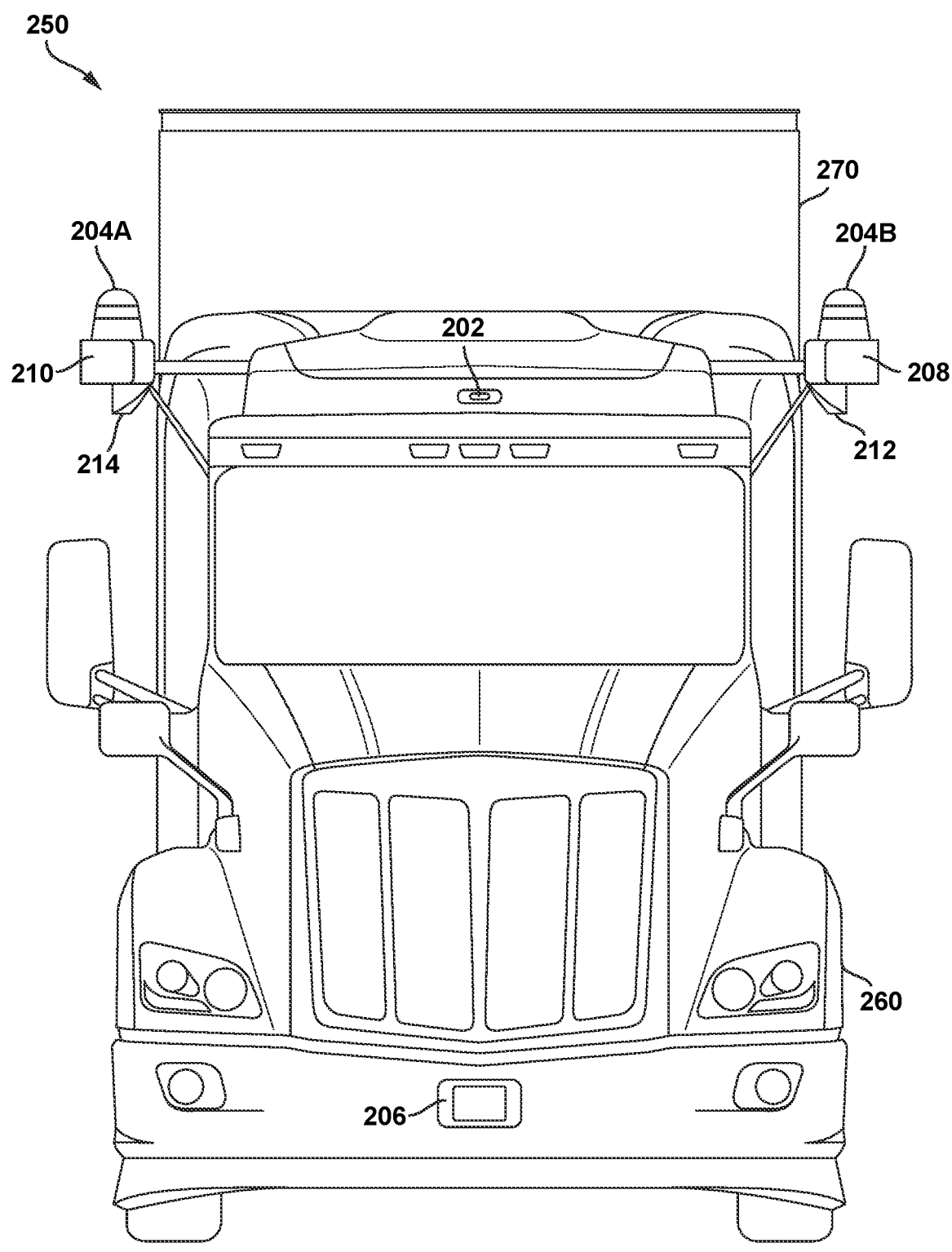
FIG. 2F is an illustration of a physical configuration of a vehicle, according to example embodiments.
Figure 2G:
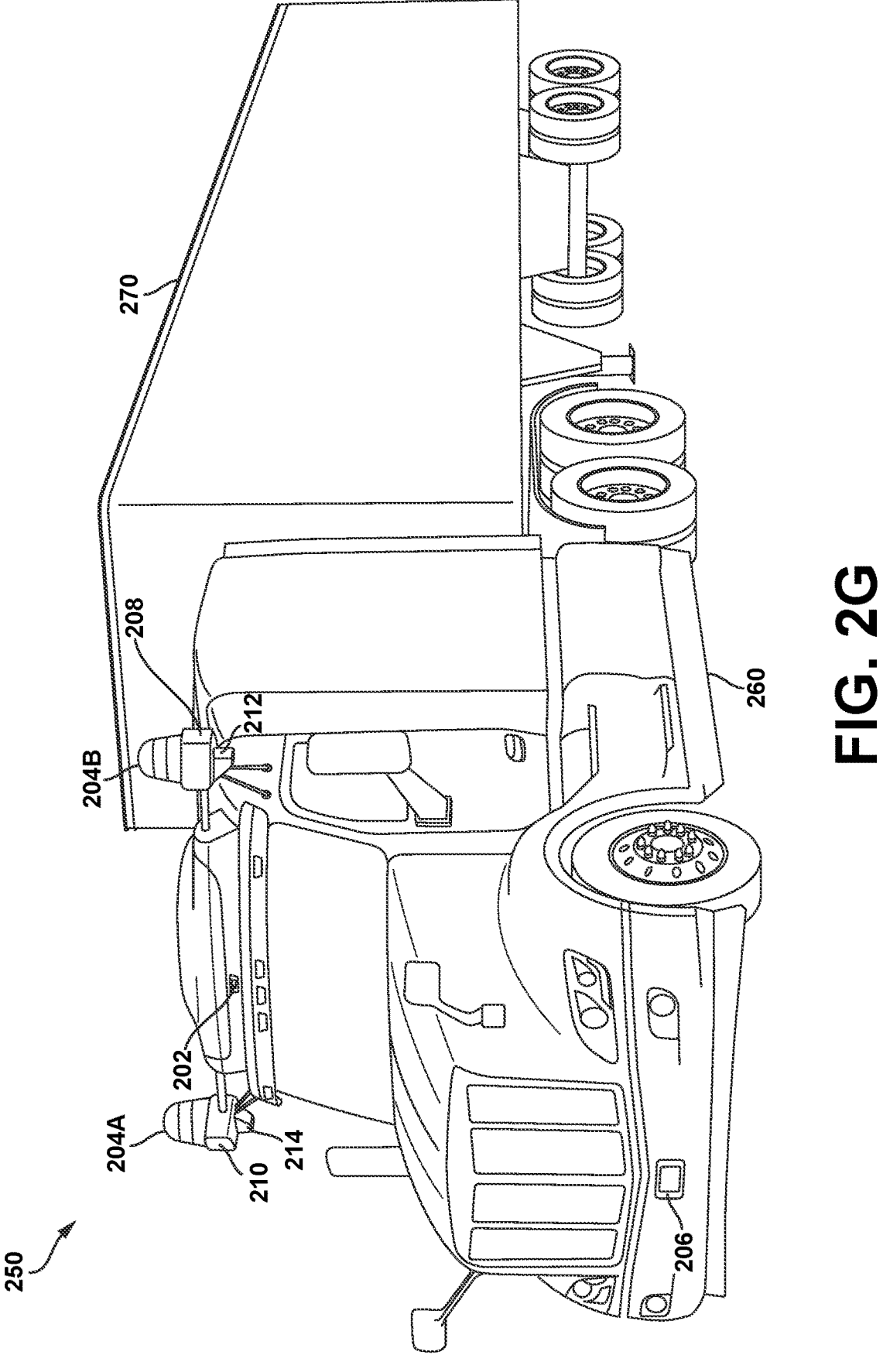
FIG. 2G is an illustration of a physical configuration of a vehicle, according to example embodiments.
Figure 2H:
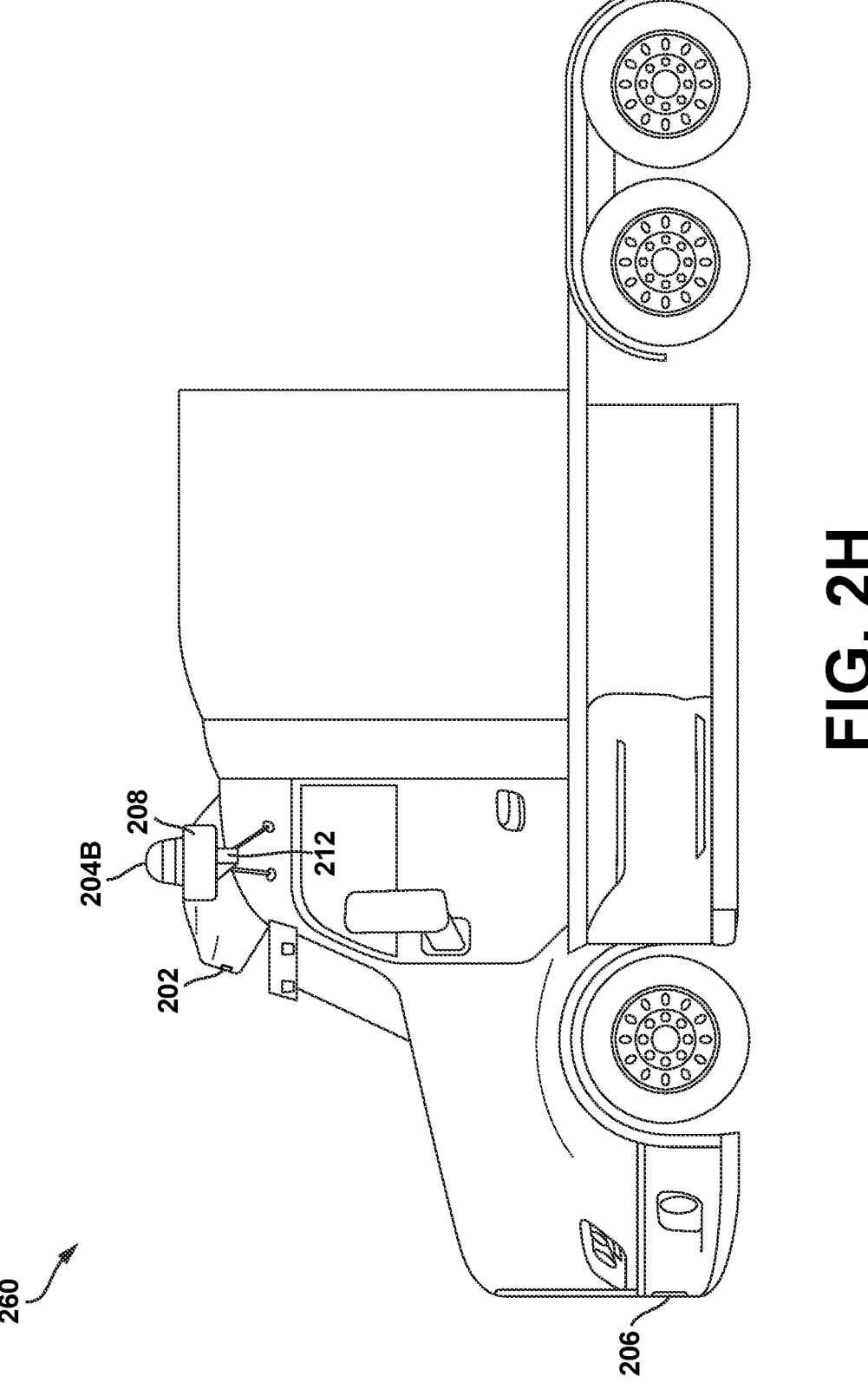
FIG. 2H is an illustration of a physical configuration of a vehicle, according to example embodiments.
Figure 2I:
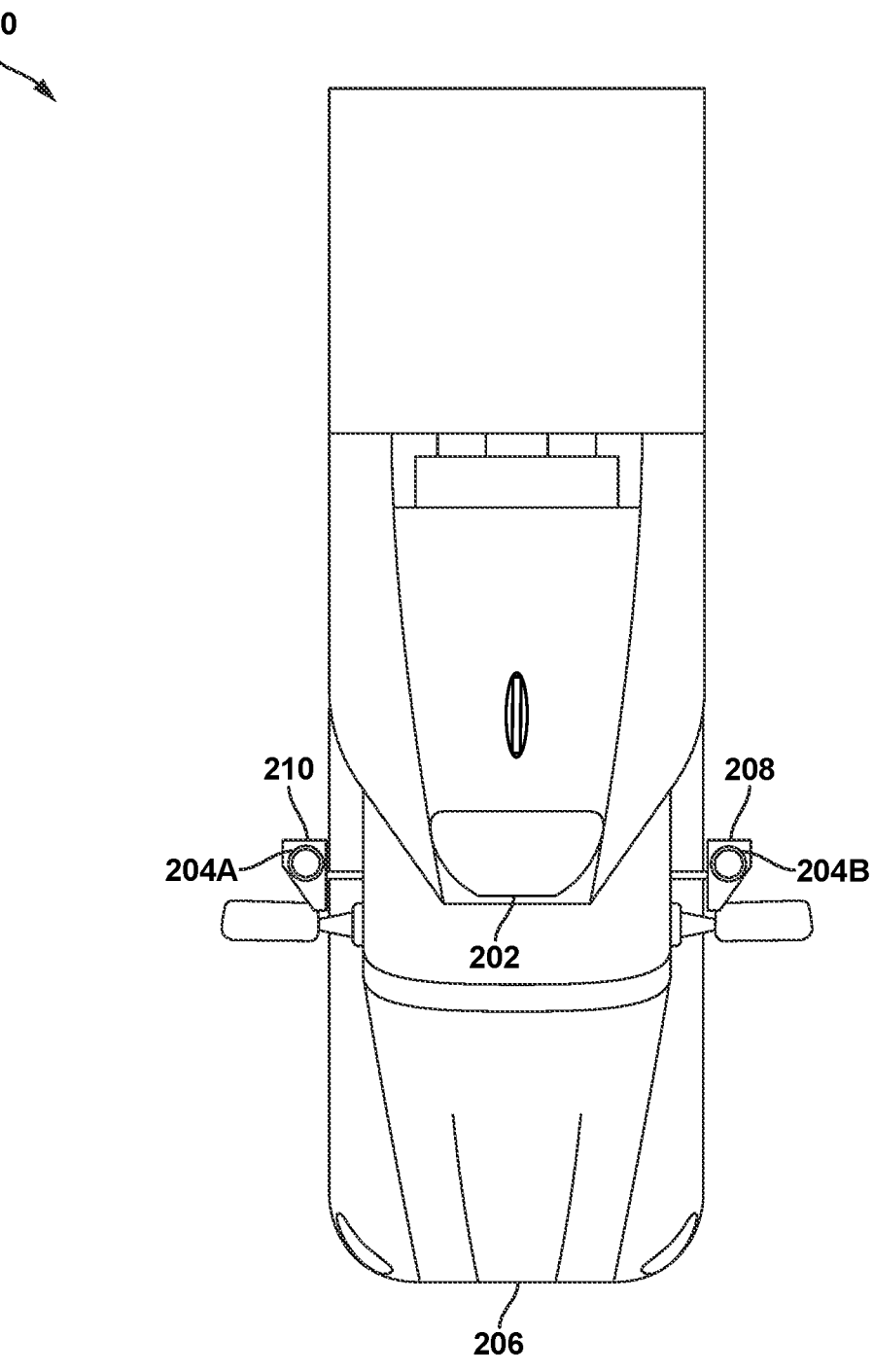
FIG. 2I is an illustration of a physical configuration of a vehicle, according to example embodiments.

As described above, in some embodiments, vehicle 200 may take the form of a van, but alternate forms are also possible and are contemplated herein. As such, FIGS. 2F-2I illustrate embodiments where vehicle 250 takes the form of a semi-truck. For example, FIG. 2F illustrates a front-view of vehicle 250 and FIG. 2G illustrates an isometric view of vehicle 250. In embodiments where vehicle 250 is a semi-truck, vehicle 250 may include tractor portion 260 and trailer 270 (illustrated in FIG. 2G). FIGS. 2H and 2I provide a side view and a top view, respectively, of the tractor portion 260. Similar to vehicle 200 illustrated above, vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas vehicle 200 of FIGS. 2A-2E may only include a single copy of some sensor systems (e.g., sensor system 204), vehicle 250 illustrated in FIGS. 2F-2I may include multiple copies of that sensor system (e.g., sensor systems 204A and 204B, as illustrated).

While drawings and description throughout may reference a given form of vehicle (e.g., vehicle 250 shown as a semi-truck or vehicle 200 shown as a van), it is understood that embodiments described herein can be equally applied in a variety of vehicle contexts (e.g., with modifications employed to account for a form factor of vehicle). For example, sensors and/or other components described or illustrated as being part of vehicle 200 could also be used (e.g., for navigation and/or obstacle detection and avoidance) in vehicle 250

Figure 2J:
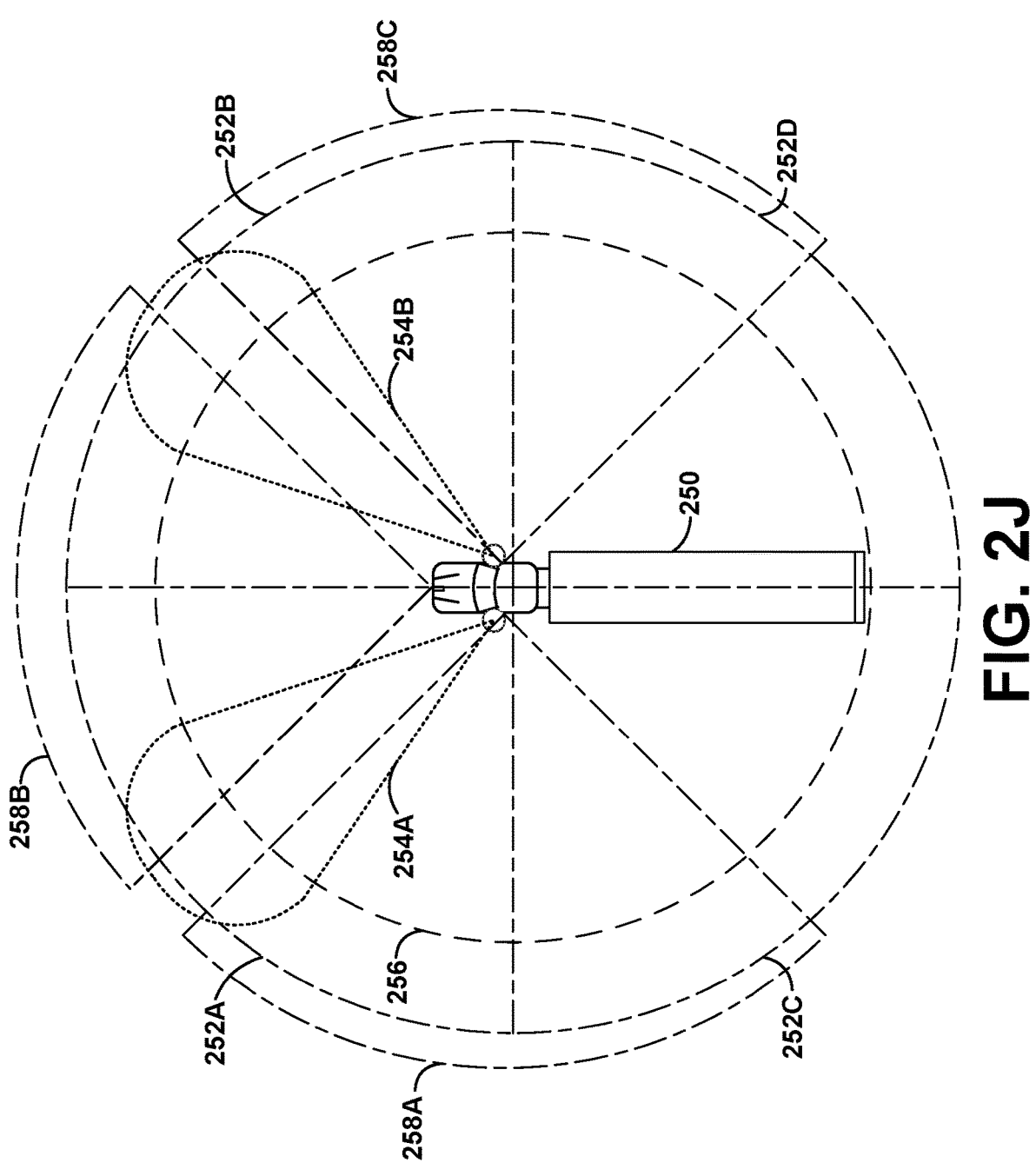
FIG. 2J is an illustration of a field of view for various sensors, according to example embodiments.

FIG. 2J illustrates various sensor fields of view (e.g., associated with vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
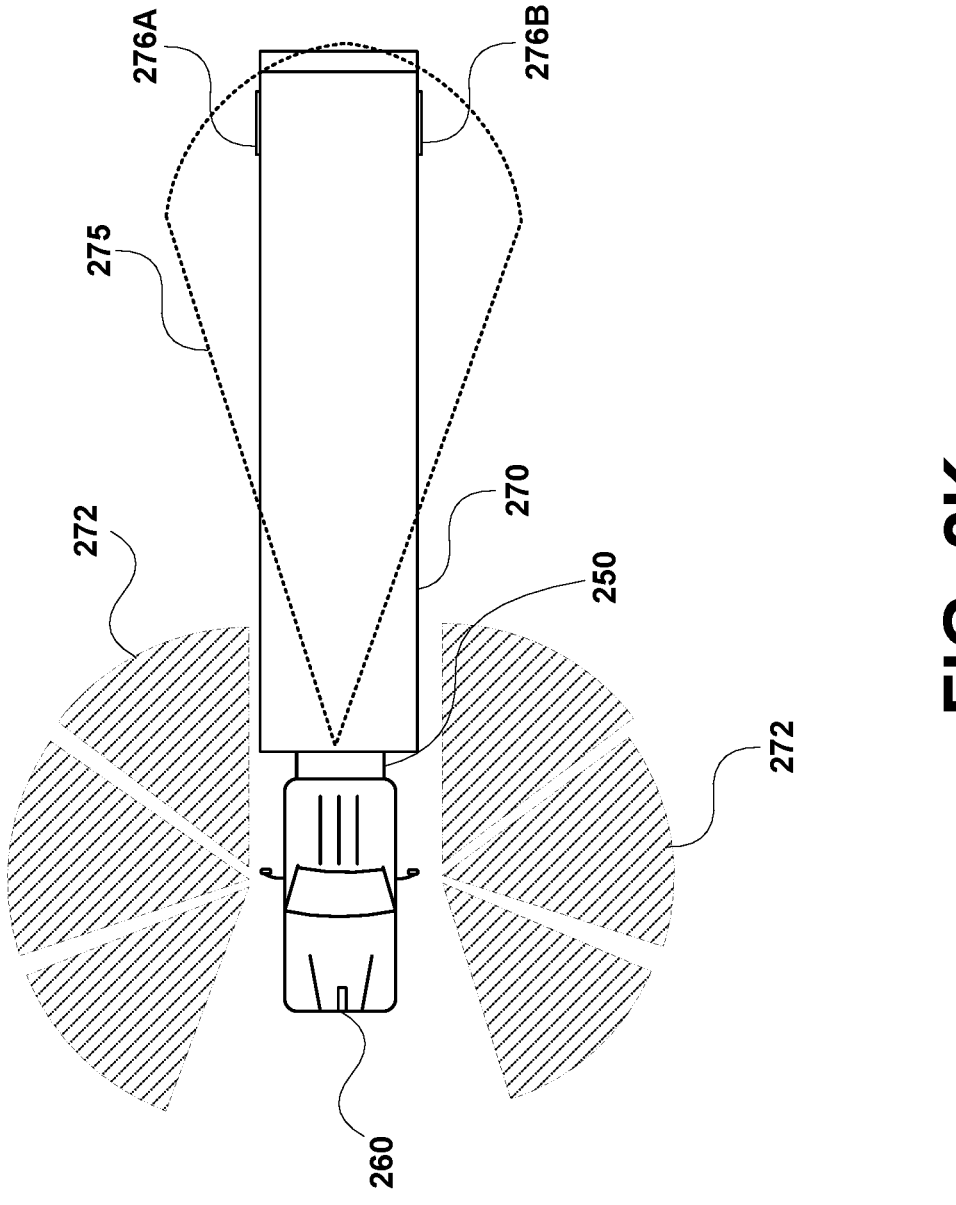
FIG. 2K is an illustration of beam steering for a sensor, according to example embodiments.

FIG. 2K illustrates beam steering for a sensor of a vehicle (e.g., vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
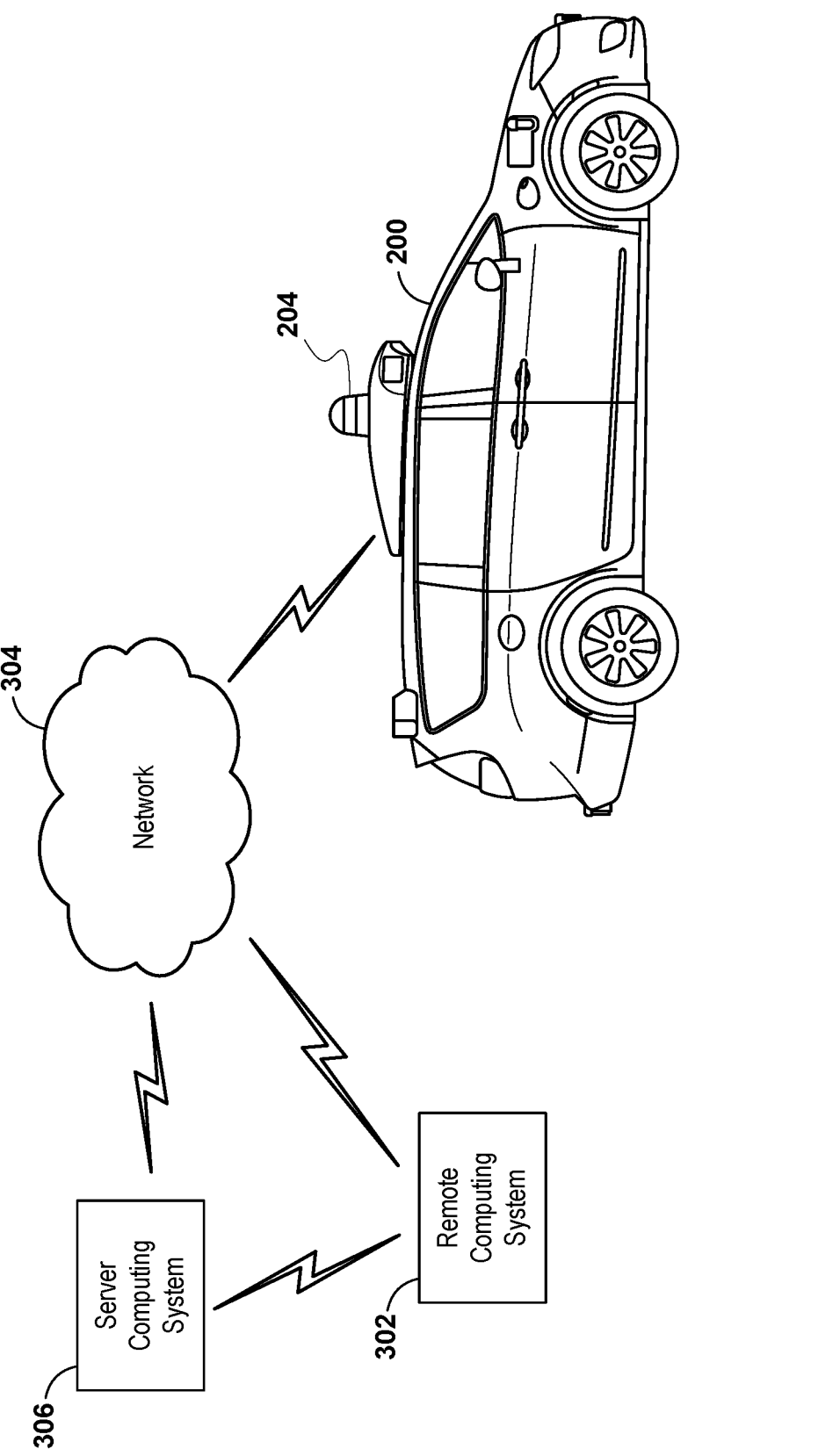
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing the velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

In some cases, vehicle 200 can use deep learning when performing disclosed techniques. In general, vehicle 200 can use deep learning techniques to enhance various aspects of operation, including to perceive its surroundings, make decisions, and navigate safely in complex environments. Deep learning involves training neural networks on large datasets to perform tasks that traditionally required explicit programming. As a building block of deep learning, an artificial neural network (ANN) is a computational model in which a number of simple units, working individually in parallel and without central control, can combine to solve complex problems. An ANN is represented as a number of nodes that are arranged into a number of layers, with connections between the nodes of adjacent layers. The layers can be divided into an input layer, hidden layers, and an output layer.

Figure 4A:
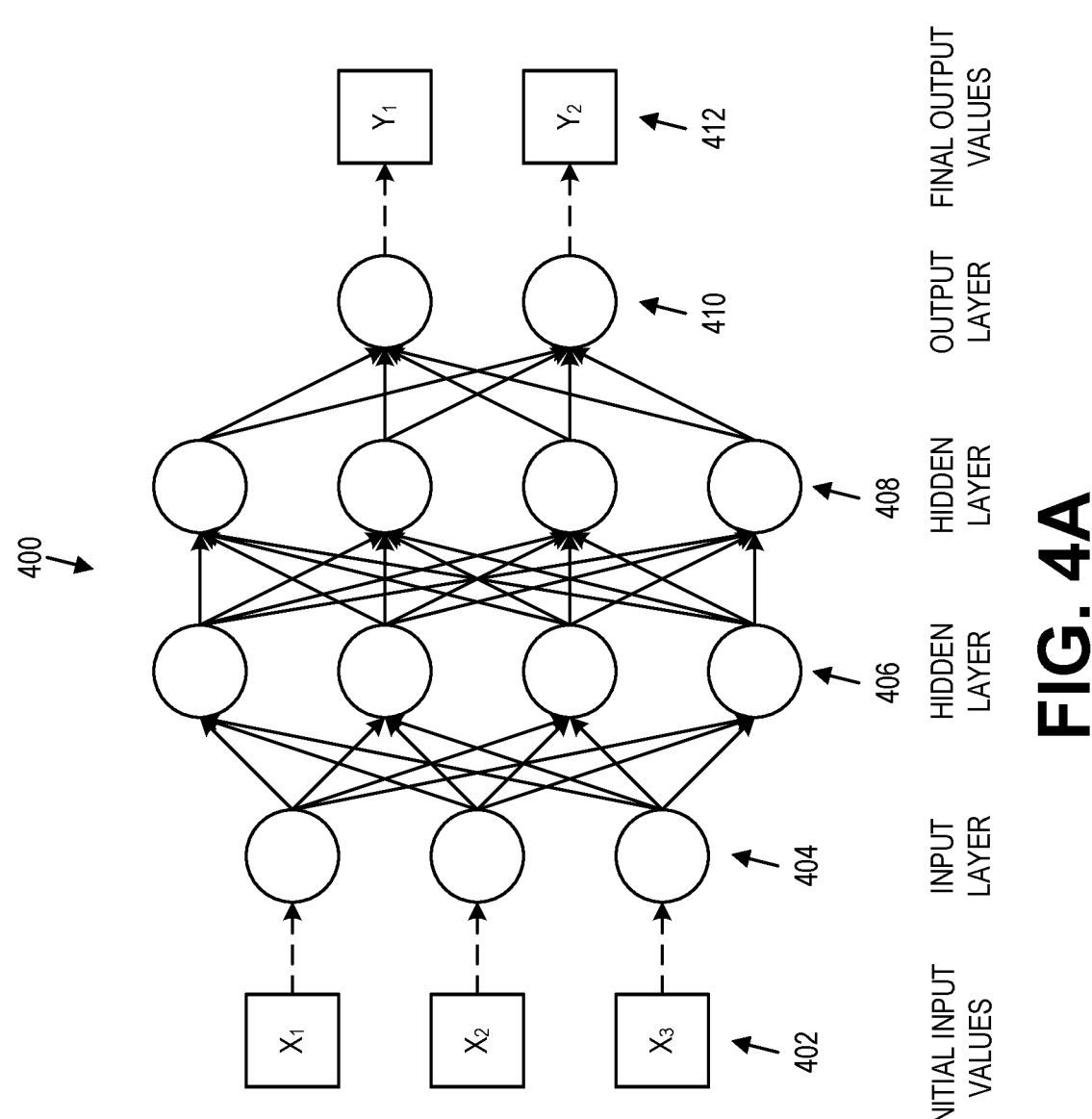
FIG. 4A depicts an artificial neural network (ANN) architecture, according to example embodiments.

FIG. 4A depicts ANN 400, which represents a feed-forward multilayer neural network. Similar structures and principles are used in convolution neural networks (CNNs), recurrent neural networks, and recursive neural networks, for example ANN 400 can be trained to perform particular tasks, such as sensor data processing techniques (e.g., seg-mentation, semantic segmentation, image enhancements) and techniques described herein. For instance, ANN 400 can be trained to use velocity data derived from stereo radars to detect and determine information about objects positioned in the environment of a vehicle. As such, ANN 400 can operate onboard the vehicle and can further input other types of sensor data to generate data for control systems to use to safely navigate complex environments. In further examples, ANN 400 can learn to perform other tasks, such as computer vision, risk evaluation, etc.

As shown in FIG. 4A, ANN 400 consists of four layers: input layer 404, hidden layer 406, hidden layer 408, and output layer 410. The three nodes of input layer 404 respectively receive $X_1$, $X_2$, and $X_3$ as initial input values 402. The two nodes of output layer 410 respectively produce $Y_1$ and $Y_2$ as final output values 412. As such, ANN 400 is a fully-connected network, in that nodes of each layer aside from input layer 404 receive input from all nodes in the previous layer. In some examples, initial input values 402 may include radar data from multiple radars and final output values 412 may represent attributes for the object, such as specifying a shape, a size, a pose, a near-term intent, a classification, and/or other information about the object.

In the example, the solid arrows between pairs of nodes represent connections through which intermediate values flow, and are each associated with a respective weight that is applied to the respective intermediate value. Each node performs an operation on its input values and their associ-ated weights (e.g., values between 0 and 1, inclusive) to produce an output value. In some cases this operation may involve a dot-product sum of the products of each input value and associated weight. An activation function may be applied to the result of the dot-product sum to produce the output value. Other operations are possible.

For example, if a node receives input values {$x_1$, $X_2$, . . . , $x_n$} on n connections with respective weights of {$w_1$, $w_2$, . . . , $w_n$}, the dot-product sum d may be determined as:

$$d = \sum_{i=1}^{n} x_i w_i + b \qquad (1)$$

Where b is a node-specific or layer-specific bias.

Notably, the fully-connected nature of ANN 400 can be used to effectively represent a partially-connected ANN by giving one or more weights a value of 0. Similarly, the bias can also be set to 0 to eliminate the b term. An activation function, such as the logistic function, may be used to map d to an output value y that is between 0 and 1, inclusive:

$$y = \frac{1}{1 + e^{-d}} \qquad (2)$$

Functions other than the logistic function, such as the sigmoid or tanh functions, may be used instead. Then, y may be used on each of the node's output connections, and will be modified by the respective weights thereof. In ANN 400, the input values and weights are applied to the nodes of each layer, from left to right until final output values 412 are produced. If ANN 400 has been fully trained, final output values 412 are a proposed solution to the problem that ANN 400 has been trained to solve. In order to obtain a mean-ingful, useful, and reasonably accurate solution, ANN 400 requires at least some extent of training. Training ANN 400 may involve providing some form of supervisory training data, namely sets of input values and desired, or ground truth, output values. For example, supervisory training may enable an ANN to perform non-semantic tasks, which can involve providing training datasets to determine desired representations. For ANN 400, this training data may include m sets of input values paired with output values. More formally, the training data may be represented as:

$$\{X_{1,i}, X_{2,i}, X_{3,i}, \widehat{Y_{1,i}}, \widehat{Y_{2,i}}\} \qquad (3)$$

where i=1 . . . m, and $\widehat{Y_{1,i}}$ and $\widehat{Y_{2,i}}$ are the desired output values for the input values of $X_{1,i}$, $X_{2,i}$, and $X_{3,i}$.

The training process involves applying the input values from such a set to ANN 400 and producing associated output values. A loss function can be used to evaluate the error between the produced output values and the ground truth output values. In some instances, this loss function may be a sum of differences, mean squared error, or some other metric. In some cases, error values are determined for all of the m sets, and the error function involves calculating an aggregate (e.g., an average) of these values.

Once the error is determined, the weights on the connec-tions are updated in an attempt to reduce the error. In simple terms, this update process should reward "good" weights and penalize "bad" weights. Thus, the updating should distribute the "blame" for the error through ANN 400 in a fashion that results in a lower error for future iterations of the training data. For example, the update process can involve modifying at least one weight of ANN 400 such that subsequent applications of ANN 400 on training data gen-erates new outputs that more closely match the ground truth masks that correspond to the training data.

The training process continues applying the training data to ANN 400 until the weights converge. Convergence occurs when the error is less than a threshold value or the change in the error is sufficiently small between consecutive itera-tions of training. At this point, ANN 400 is said to be "trained" and can be applied to new sets of input values in order to predict output values that are unknown. When trained to perform image processing techniques, ANN 400 may produce outputs of input images that closely resemble ground truths (i.e., desired results) created for the input images. In some embodiments, when trained to use radar data and other sensor data to detect objects and determine attributes for the objects, ANN 400 may generate outputs that localize and describe various objects and surfaces in an environment.

Many training techniques for ANNs make use of some form of backpropagation. During backpropagation, input signals are forward-propagated through the network the outputs, and network errors are then calculated with respect to target variables and back-propagated backwards towards the inputs. Particularly, backpropagation distributes the error one layer at a time, from right to left, through ANN 400. Thus, the weights of the connections between hidden layer 408 and output layer 410 are updated first, the weights of the connections between hidden layer 406 and hidden layer 408 are updated second, and so on. This updating is based on the derivative of the activation function.

Figure 4B:
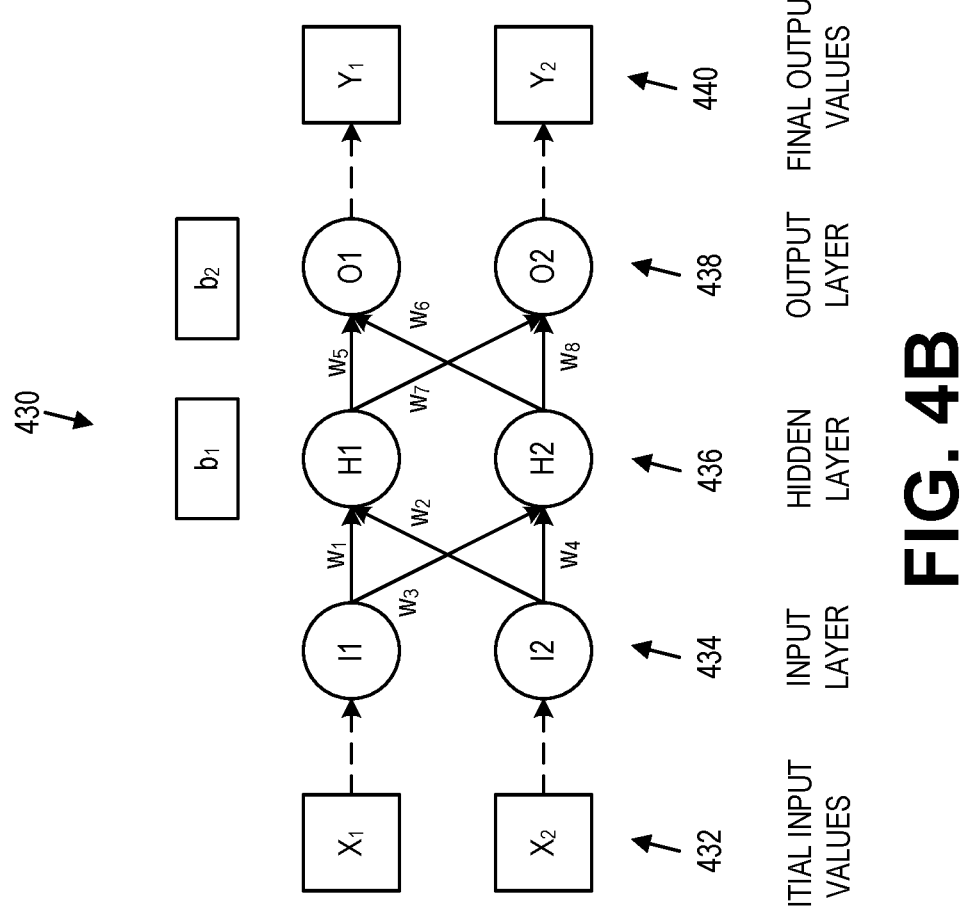
FIG. 4B depicts training the ANN, according to example embodiments.

In order to further explain error determination and back-propagation, it is helpful to look at an example of the process in action. However, backpropagation can become quite complex to represent except on the simplest of ANNs. Therefore, FIG. 4B depicts ANN 430 in a simple form in order to provide an illustrative example of backpropagation.

TABLE 1

| Weight | Nodes |
|--------|-------|
| $w_1$ | I1, H1 |
| $w_2$ | I2, H1 |
| $w_3$ | I1, H2 |
| $w_4$ | I2, H2 |
| $w_5$ | H1, O1 |
| $w_6$ | H2, O1 |
| $w_7$ | H1, O2 |
| $w_8$ | H2, O2 |

ANN 430 consists of three layers, input layer 434, hidden layer 436, and output layer 438, each having two nodes. Initial input values 432 are provided to input layer 434, and output layer 438 produces final output values 440. Weights have been assigned to each of the connections and biases (e.g., $b_1$, $b_2$ shown in FIG. 4B) may also apply to the net input of each node in hidden layer 436 in some examples. For clarity, Table 1 maps weights to pairs of nodes with connections to which these weights apply. As an example, $w_2$ is applied to the connection between nodes I2 and H1, $w_7$ is applied to the connection between nodes H1 and O2, and so on.

The goal of training ANN 430 is to update the weights over some number of feed forward and backpropagation iterations until the final output values 440 are sufficiently close to designated desired outputs. Note that use of a single set of training data effectively trains ANN 430 for just that set. If multiple sets of training data are used, ANN 430 will be trained in accordance with those sets as well.

To initiate the feed forward pass, net inputs to each of the nodes in hidden layer 436 are calculated. From the net inputs, the outputs of these nodes can be found by applying the activation function. For node H1, the net input $net_{H1}$ is:

$$net_{H1} = w_1 X_1 + w_2 X_2 + b_1 \tag{4}$$

Applying the activation function (here, the logistic function) to this input determines that the output of node H1, $out_{H1}$ is:

$$out_{H1} = \frac{1}{1 + e^{-net_{H1}}} \tag{5}$$

Following the same procedure for node H2, the output $out_{H2}$ can also be determined. The next step in the feed forward iteration is to perform the same calculations for the nodes of output layer 438. For example, net input to node O1, $net_{O1}$ is:

$$net_{O1} = w_5 out_{H1} + w_6 out_{H2} + b_2 \tag{6}$$

Thus, output for node O1, $out_{O1}$ is:

$$out_{O1} = \frac{1}{1 + e^{-net_{O1}}} \tag{7}$$

Following the same procedure for node O2, the output $out_{O2}$ can be determined. At this point, the total error, $\Delta$, can be determined based on a loss function. For instance, the loss function can be the sum of the squared error for the nodes in output layer 410. In other words:

$$\Delta = \Delta_{O1} + \Delta_{O2} = \frac{1}{2}(out_{O1} - \hat{Y}_1)^2 + \frac{1}{2}(out_{O2} - \hat{Y}_2)^2 \tag{8}$$

The multiplicative constant $$\frac{1}{2}$$

in each term is uses to simplify differentiation during back-propagation. Since the overall result is scaled by a learning rate anyway, this constant does not negatively impact the training. Regardless, at this point, the feed forward iteration completes and backpropagation begins.

As noted above, a goal of backpropagation is to use $\Delta$ (i.e., the total error determined based on a loss function) to update the weights so that they contribute less error in future feed forward iterations. As an example, consider the weight $w_5$. The goal involves determining how much the change in $w_5$ affects $\Delta$. This can be expressed as the partial derivative $$\frac{\partial \Delta}{\partial w_5}.$$

Using the chain rule, this term can be expanded as:

$$\frac{\partial \Delta}{\partial w_5} = \frac{\partial \Delta}{\partial out_{O1}} \times \frac{\partial out_{O1}}{\partial net_{O1}} \times \frac{\partial net_{O1}}{\partial w_5} \tag{9}$$

Thus, the effect on $\Delta$ of change to $w_5$ is equivalent to the product of (i) the effect on $\Delta$ of change to $out_{O1}$, (ii) the effect on $out_{O1}$ of change to $net_{O1}$, and (iii) the effect on $net_{O1}$ of change to $w_5$. Each of these multiplicative terms can be determined independently. Intuitively, this process can be thought of as isolating the impact of $w_5$ on $net_{O1}$, the impact of $net_{O1}$ on $out_{O1}$, and the impact of $out_{O1}$ on $\Delta$.

This process can be repeated for the other weights feeding into output layer 438. Note that no weights are updated until the updates to all weights have been determined at the end of backpropagation. Then, all weights are updated before the next feed forward iteration.

After updates to the remaining weights, $w_1$, $w_2$, $w_3$, and $w_4$ are calculated, backpropagation pass is continued to hidden layer 436. This process can be repeated for the other weights feeding into output layer 438. At this point, the backpropagation iteration is over, and all weights have been updated. ANN 430 may continue to be trained through subsequent feed forward and backpropagation iterations. In some instances, after over several feed forward and back-propagation iterations (e.g., thousands of iterations), the error can be reduced to produce results that approximate the original desired results. At that point, the values of $Y_1$ and $Y_2$ will be close to the target values. As shown, by using a differentiable loss function, the total error of predictions output by ANN 430 compared to desired results can be determined and used to modify weights of ANN 430 accordingly.

In some cases, an equivalent amount of training can be accomplished with fewer iterations if the hyper parameters of the system (e.g., the biases $b_1$ and $b_2$ and the learning rate a) are adjusted. For instance, setting the learning rate closer to a particular value may result in the error rate being reduced more rapidly. Additionally, the biases can be updated as part of the learning process in a similar fashion to how the weights are updated. As such, ANN 430 is just a simplified example. Arbitrarily complex ANNs can be developed with the number of nodes in each of the input and output layers tuned to address specific problems or goals. Further, more than one hidden layer can be used and any number of nodes can be in each hidden layer.

Figure 5:
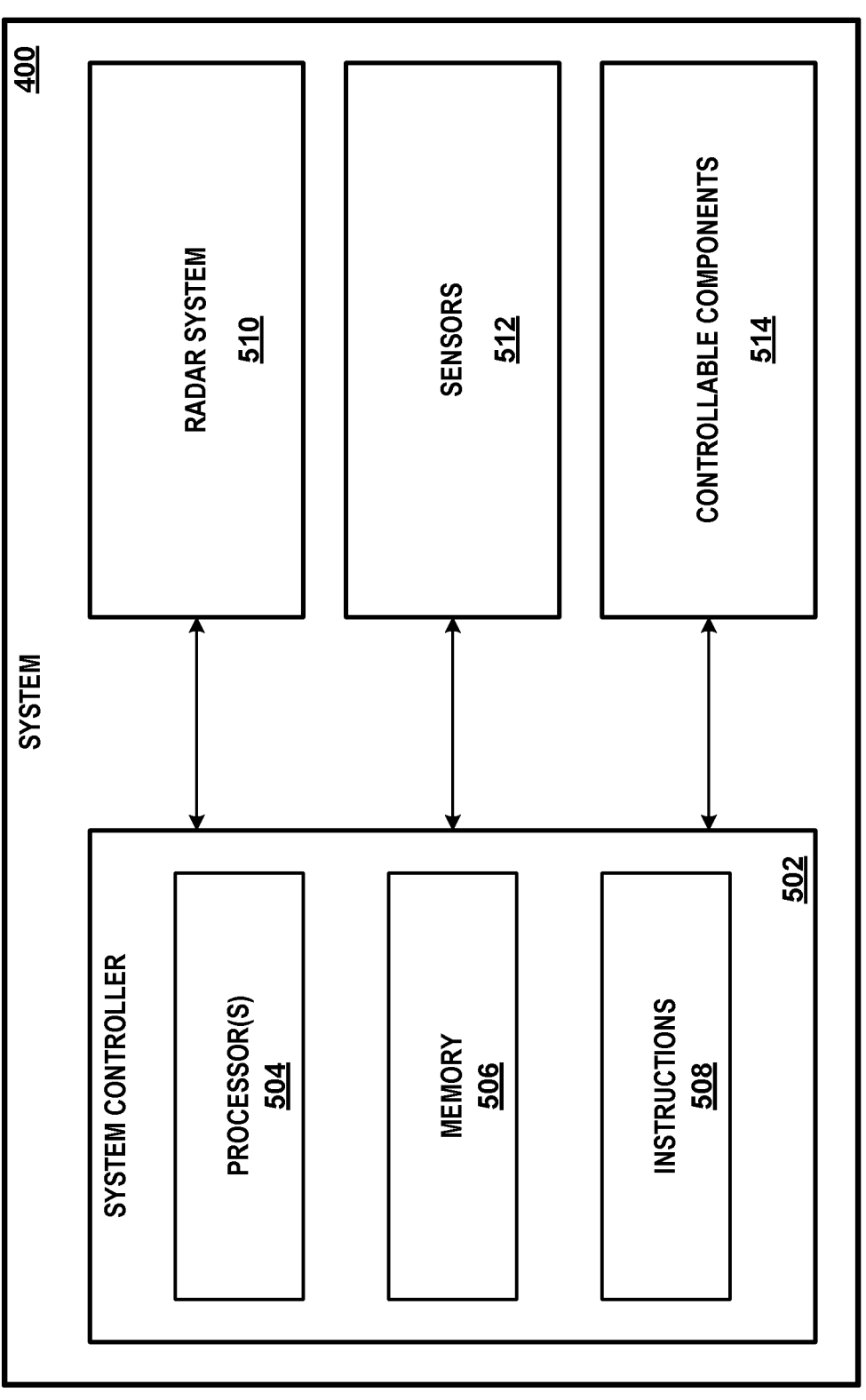
FIG. 5 is a block diagram of a system including a radar unit, according to example embodiments.

FIG. 5 is a block diagram of a system that includes system controller 502, radar system 510, sensors 512, and controllable components 514. System controller 502 includes processor(s) 504, memory 506, and instructions 508 stored on memory 506 and executable by processor(s) 504 to perform functions, such as the operations disclosed herein.

Processor(s) 504 can include one or more processors, such as one or more general-purpose microprocessors (e.g., having a single core or multiple cores) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

Memory 506 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

Radar system 510 can be used in autonomous or semi-autonomous vehicles for navigation and object detection by using radio waves to detect and measure the distance, speed, and direction of objects in the surrounding environment. Radar system 510 can include one or multiple radar units, which each consists of a radar transmitter that emits radio waves and a radar receiver that captures the reflected waves from objects. By analyzing the time it takes for the waves to return and their frequency shifts (Doppler Effect), radar system 510 can determine the presence, location, and movement of objects.

In the context of autonomous or semi-autonomous vehicles, radar system 510 provides measurements that can assist with navigation and collision avoidance. Radar units are typically mounted on the vehicle's exterior, such as the front, rear, and sides. During navigation, radar system 510 may continuously emit radio waves in various directions, scanning the environment around the vehicle. When the waves encounter an object, they bounce back to a radar receiver, thereby enabling radar system 510 to analyze the reflected waves to calculate the distance, relative speed, and angle of the object. This information can be used by the vehicle's control system to make decisions and adjust the vehicle's trajectory accordingly, enabling it to detect and react to obstacles, pedestrians, vehicles, and other potential hazards in its path. By providing real-time data about the surrounding environment, radar system 510 can enhance the vehicle's perception capabilities and contribute to safer and more reliable navigation.

Radar system 510 offers operational benefits over other types of sensors in some aspects, such as cameras and lidar. Radar can perform well in adverse weather conditions, such as rain, fog, or dust, where other sensors might be limited. In particular, radio waves emitted by radar system 510 can penetrate these adverse conditions and provide reliable object detection. This makes radar particularly useful for enhancing the robustness and safety of autonomous or semi-autonomous vehicles in various weather scenarios. In addition, radar also excels at detecting the velocity and relative speed of nearby objects, which is useful for assessing the movement of surrounding vehicles, pedestrians, and other obstacles. By providing accurate speed information, radar system 510 enables the vehicle (or a driver of the vehicle) to make informed decisions about potential collision risks and adjust its behavior accordingly. In some cases, radar system 510 can also offer a longer range of measurements and broader field of view when compared to other sensors coupled to the vehicle.

Similarly, system controller 502 may use outputs from radar system 510 and sensors 512 to determine the characteristics of system 500 and/or characteristics of the surrounding environment. For example, sensors 512 may include one or more of a GPS, an IMU, an image capture device (e.g., a camera), a light sensor, a heat sensor, one or more lidar devices, and other sensors indicative of parameters relevant to system 500 and/or the surrounding environment. Radar system 510 is depicted as separate from sensors 512 for purposes of example, and may be considered as part of or as sensors 512 in some examples.

Figure 6A:
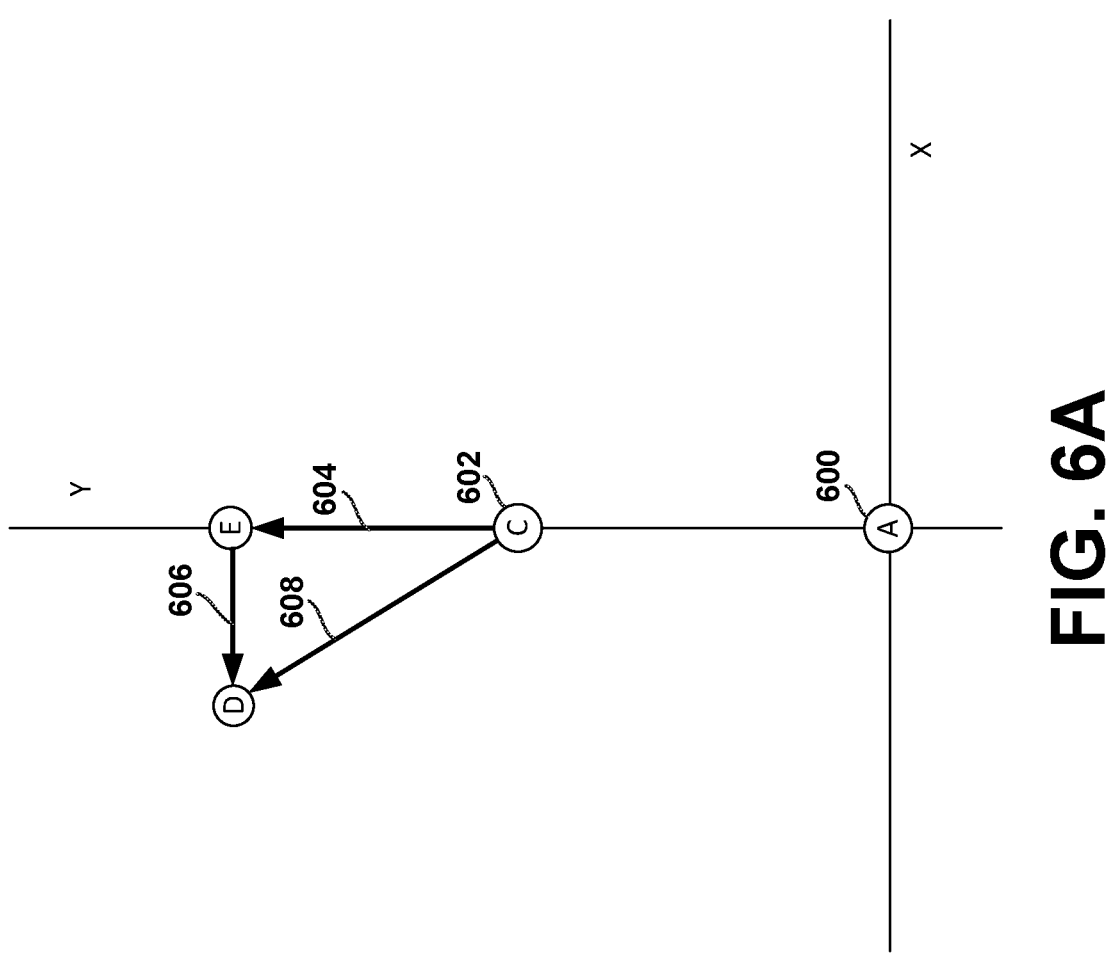
FIG. 6A illustrates a representation of a single radar measuring a radial speed of an object, according to example embodiments.

Based on characteristics of system 500 and/or the surrounding environment determined by system controller 502 based on the outputs from radar system 510 and the sensors 512, system controller 502 may control the controllable components 514 to perform one or more actions. For example, system 500 may correspond to a vehicle, in which case the controllable components 514 may include a braking system, a turning system, and/or an accelerating system of the vehicle, and system controller 502 may change aspects of these controllable components based on characteristics determined from radar system 510 and/or sensors 512 (e.g., when system controller 502 controls the vehicle in an autonomous or semi-autonomous mode). Within examples, radar system 510 and sensors 512 are also controllable by system controller 502. FIG. 6A shows a representation of radar (A) 600 obtaining measurements of object (C) 602 that include radial velocity vector (CE) 604, but lack lateral vector (ED) 606 of velocity vector (CD) 608 for object (C) 602. The example representation shows an overview of a 2D arrangement with y-component and x-component and is included to illustrate how a single radar (radar (A) 600) is able to only provide vehicle computing systems with an estimate of radial speed of object (C) 602 along the line-of-sight of radar (A) 600.

As shown in FIG. 6A, radial velocity vector (CE) 604 represents the radial speed of object (C) 602 as measured along the line-of-sight by radar (A) 600 and refers to the component of velocity vector (CD) 608 that extends directly toward or away from radar (A) 600. When object (C) 602 is moving directly toward or away from radar (A) 600, radar signals emitted and received by radar (A) 600 experience a Doppler shift in frequency due to the motion of object (C) 602. This shift in frequency is used to calculate the radial speed of the object relative to radar (A) 600, which measures the change in frequency to determine how fast that object (C) 602 is moving directly toward or away from radar (A) 600. As such, radar (A) 600 is not able to provide information about the lateral velocity of object (C) 602 (represented by lateral vector (ED) 606), which is the velocity component perpendicular to the line of sight. If object (C) 602 is moving sideways relative to radar (A) 600, lateral vector (ED) 606 may not significantly affect the Doppler shift measurement obtained by radar (A) 600.

In some cases, the radar data provided by radar (A) 602 is used as an input to one or multiple neural networks. For instance, imaging radar use multiple antennas to create high-resolution radar images that can provide detailed information about the shapes and sizes of objects in the environment. The radar images generated by radar can help vehicle systems better understand the surrounding environment to make more informed decisions in complex scenarios. For instance, the radar data representation provided to the neural networks can take the form of a dense Bird's Eye View (BEV) image of the environment, where each pixel in the BEV image represents an estimated radial speed for a surface/object at that location. In some cases, each pixel can also convey the strength of the radar return signal (i.e., radar cross-section), which can provide information about the size and shape of detected objects. Larger objects and certain materials (e.g., metals) generally produce stronger radar reflections.

Figure 6B:
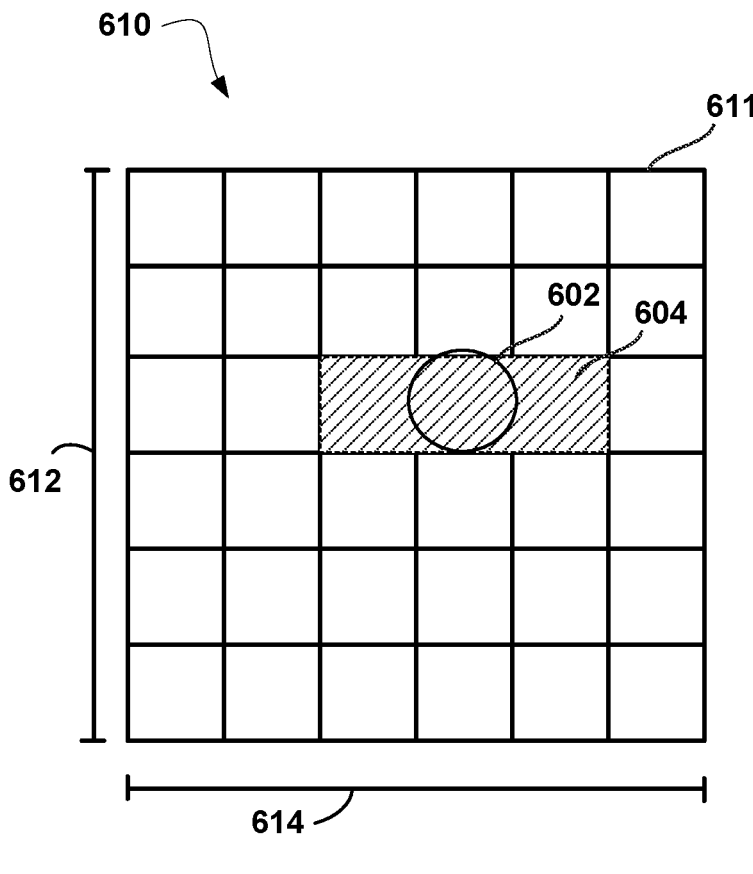
FIG. 6B illustrates radar imagery generated based on the radar data obtained in FIG. 6A, according to example embodiments.

As an example, FIG. 6B shows radar image 610 where each pixel (e.g., pixel 611) conveys a radar-measured radial speed for a surface or object positioned at the represented location. In general, a radar image corresponds to a visual representation of the data collected by the radar system and shows the locations and characteristics of objects in its field of view. In the example, radar image 610 shows radial velocity vector (CE) 604 for object (C) 602. Although pixels in radar image 610 provides radial speeds measured for objects in the environment, a neural network is unable to use radar image 610 shown in FIG. 6B to estimate an accurate velocity vector for objects (e.g., object (C) 602). In particular, the pixels in the radar image 610 shown in FIG. 6B provide assigned values (radial speed) that lack a lateral velocity component.

Disclosed techniques can be performed by a vehicle radar system or another computing system to supplement the radial speeds received from a single radar by using measurements obtained from other radars. In particular, multiple radars with partially overlapping field of views can capture measurements of the same locations in the environment from different perspectives, which allows the vehicle radar system to refine the velocity channel of the radar image and thereby solve the issue of only providing only radial speed of the object as an input into neural networks for subsequent processing.

Figure 6C:
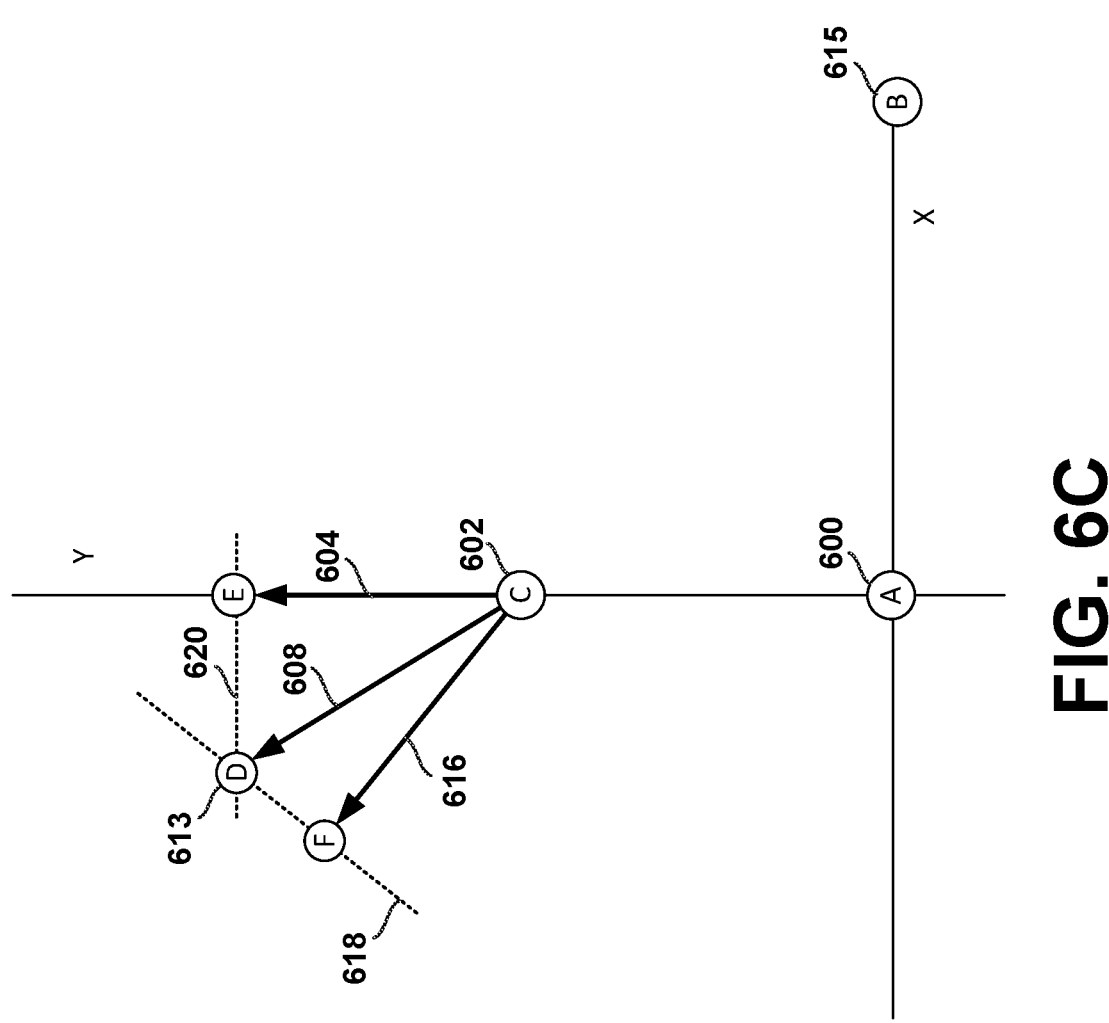
FIG. 6C illustrates another representation showing stereo radars obtaining measurements of the object, according to example embodiments.

To illustrate an example, FIG. 6C shows the addition of radar (B) 615 capturing measurements of object (C) 602 that can supplement the measurements captured by radar (A) 600. In particular, by adding radar (B) 615, each radar can measure a radial speed vector along a different radial axis, which allows the radar system to estimate lateral velocity information for object (C) 602 as well as other objects in the environment.

As shown in the representation depicted in FIG. 6C, radar (A) 600 is measuring radial velocity vector (CE) 604 while radar (B) 615 is measuring radial velocity vector (CF) 616. Radial velocity vector (CE) 604 and radial velocity vector (CF) 616 form a valid mathematical basis for deriving velocity vector (CD) 608. In particular, velocity vector (CD) 608 can be derived by constructing line 620 extending perpendicular to radial velocity vector (CE) 604 and passing through point (F) and line 620 extending perpendicular to radial velocity vector (CE) 604 and passing through point (E) as shown in FIG. 6C. The intersection of line 618 and line 620 occurs at intersection point (D) 613, which can be solved via a 2×2 linear system of equations. Equation 10 represents line 618 and equation 11 represents line 620 as follows:

$$\text{line}_{618} = \begin{bmatrix} E_x - C_x \\ E_y - C_y \\ E^T(C - E) \end{bmatrix} \tag{10}$$

$$\text{line}_{620} = \begin{bmatrix} E_x - C_x \\ E_y - C_y \\ E^T(C - E) \end{bmatrix} \tag{11}$$

The intersection point (D) 613, which lies at the intersection of line 618 and line 620, can be determined by solving a 2×2 linear system of equations as follows:

$$\begin{bmatrix} E_x - C_x & E_y - C_y \\ F_x - C_x & F_y - C_y \end{bmatrix}\begin{bmatrix} D_x \\ D_y \end{bmatrix} = \begin{bmatrix} E^T(E - C) \\ F^T(F - C) \end{bmatrix} \tag{12}$$

$$\begin{bmatrix} D_x \\ D_y \end{bmatrix} =$$

$$\frac{1}{(E_x - C_x)(F_y - C_y) - (F_x - C_x)(E_y - C_y)}\begin{bmatrix} F_y - C_y & C_y - E_y \\ C_x - F_x & E_x - C_x \end{bmatrix}\begin{bmatrix} E^T(E - C) \\ F^T(F - C) \end{bmatrix}$$

After calculating intersection point (D) 613, the velocity vector (CD) 608 is known and can be used to further calculate the lateral component (ED) of velocity vector (CD) 608 (as represented by lateral vector (ED) 606 shown in FIG. 6A). Lateral component (ED) (and velocity vector (CD) 608 in general) can be used by the neural networks.

In some examples, an additional radar can be used to provide a third radial velocity measurement vector (EG). In particular, the addition of a third radar provides more measurements from yet another perspective that differs from the other radars. The third radar is used to resolve a third dimension of velocity in situations where the three radars are not collinear. In this case, the point D is the intersection of 3 planes that each pass through the radial velocity vector endpoints of each radar's measurement and are orthogonal to that radar's radial vector. The intersection point D can be recovered by solving a 3×3 system of equations as follows:

$$\begin{bmatrix} E_x - C_x & E_y - C_y & E_z - C_z \\ F_x - C_x & F_y - C_y & F_z - C_z \\ G_x - C_x & G_y - C_y & G_z - C_z \end{bmatrix}\begin{bmatrix} D_x \\ D_y \\ D_z \end{bmatrix} = \begin{bmatrix} E^T(E - C) \\ F^T(F - C) \\ G^T(G - C) \end{bmatrix} \tag{13}$$

In some examples, the lateral component (ED) of the true velocity vector CD can be expressed in radar imagery for each pixel in an orthogonal basis (such as the vehicle coordinate frame) thereby allowing two channels of information per pixel.

Figure 6D:
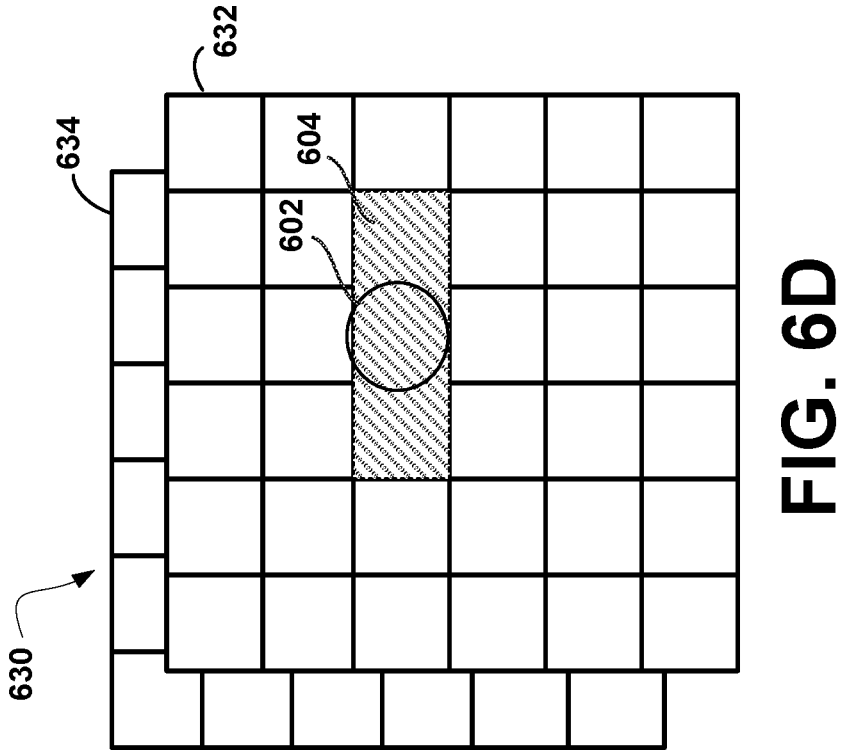
FIG. 6D illustrates radar imagery generated based on the radar data obtained by the stereo radars in FIG. 6C, according to example embodiments.

As an example, FIG. 6D illustrates 2D radar imagery generated based on the radar data obtained by the stereo radars in FIG. 6C. As shown in FIG. 6D, the single radial speed channel shown in the radar image in FIG. 6B is replaced by two channels: x-component channel 632 corresponding to lateral vector (ED) 606 and y-component channel 634 corresponding to radial velocity vector (CE) 604.

FIG. 7 is a flow chart of method 700. Method 700 may include one or more operations, functions, or actions as illustrated by one or more of blocks 702, 704, 706, 708, and 710. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. In addition, a variety of machines can be used to perform blocks of method 700.

At block 702, method 700 involves receiving, at a computing system, first radar data from a first radar and second radar data from a second radar. The first radar and the second radar are coupled at different locations on a vehicle traveling in an environment. For instance, both radars can be forward-facing radars positioned near the headlights or other portions of the vehicle.

In some examples, the vehicle radar system or another computing system onboard the vehicle causes the first radar to transmit first radar signals into the environment based on a first waveform and a first pulse repetition frequency and the second radar to transmit second radar signals into the environment based on a second waveform and a second pulse repetition frequency.

At block 704, method 700 involves determining a first radial speed for an object in the environment based on the first radar data and a second radial speed for the object based on the second radar data.

At block 706, method 700 involves estimating, based on the first radial speed and the second radial speed, a velocity vector for the object relative to the vehicle.

In some examples, a computing system transforms the first radial speed from a first frame corresponding to the first radar into a first vector in a vehicle frame corresponding to the vehicle and transforms the second radial speed from a second frame corresponding to the second radar into a second vector in the vehicle frame. The computing system can then determine an intersection point between a first line extending orthogonal to the first vector and a second line extending orthogonal to the second vector. The computing system may estimate the velocity vector for the object based on the determined intersection point and a position of the object.

At block 708, method 700 involves providing the estimated velocity vector as an input into a neural network. In addition, additional information can be supplied as inputs into the neural network, including other radar data information or measurements generated by other types of sensors. For instance, the computing system can provide a return intensity determined based on the first and second radar data as a second input into the neural network. In some cases, the computing system may determine a mean return intensity based on a first return intensity measured for the object in the first radar data and a second return intensity measured for the object in the second radar data. The mean return intensity can be provided as the second input into the neural network or networks. In other cases, the computing system may compare a first max return intensity measured for the object in the first radar data and a second max return intensity measured for the object in the second radar data. Based on the comparison, the computing system may determine that the first max return intensity is greater than the second max return intensity and provide the first max return intensity as the second input into the neural network.

In some examples, the computing system generates 2-channel radar imagery based on the first radar data and the second radar data, wherein a first channel of the 2-channel radar imagery represents x-component velocity information on a per pixel basis and a second channel of the 2-channel radar image represents y-component information on the per pixel basis. The 2-channel imagery can be provided as an input to one or multiple neural networks.

In some examples, other sensor data can be provided in addition to the estimated velocity vector as inputs into one or multiple neural networks. For instance, images from a camera can be provided in addition to the estimated velocity vector as inputs into one or multiple neural networks. In some cases, sensor data from other sensors like cameras, lidar, GPS, and inertial sensors, can be provided in addition to the radar data to one or multiple neural networks. For instance, the neural network can be configured to use lidar point cloud data and images as additional inputs that supplement the radar data.

In some examples, one or multiple neural networks can operate onboard the vehicle and use velocity data extracted from the radars to detect objects and assign attributes to the objects, such as pose, intent, size, and shape. In some cases, the neural networks may also process other types of sensor data in addition to the radar data. In other cases, different neural networks can be used to process different types of sensor data. For instance, a neural network can specifically process incoming velocity vector data (and other measurements) obtained via radars while another neural network processes image data from cameras, etc. Another neural network can also be used to leverage the outputs from other neural networks to provide an additional layer of understanding of the environment.

At block 710, method 700 involves controlling the vehicle based on an output from the neural network. For instance, the vehicle can be controlled by vehicle systems based on object attributes output by the neural network for the object. The object attributes can indicate one or more of a pose, a position, a type, and an intent for the object.

Vehicle control systems can use the output(s) from one or multiple neural networks to determine control strategies for autonomous or semi-autonomous navigation. For instance, the outputs can help vehicle control systems detect and avoid obstacles encountered during navigation. This includes executing controls that mitigate potential collisions with other vehicles, pedestrians, and other obstacles occupying the nearby environment. In some cases, the vehicle control systems may execute lane changes and perform merging relative to other traffic based on the outputs provided by the neural networks. Similarly, the outputs can be used to maintain a safe following distance from the vehicle traveling in front of the vehicle. The vehicle can adjust its speed based on the speed of the lead vehicle and any changes in the traffic conditions conveyed by the neural network outputs. In addition, the neural network outputs can help with object tracking, traffic sign and signal detection, pedestrian detection, and general environmental awareness. Radar data can help the vehicle navigate safely in adverse weather conditions where other sensors might struggle, such as heavy rain, snow, and fog.

In some examples, method 700 further involves receiving third radar data from a third radar and determining a third radial speed for the object in the environment based on the third radar data. The third radar is coupled to the vehicle at a third location that differs from locations of the first radar and the second radar. For instance, the third radar can be positioned at a higher position on the vehicle enabling the radar returns from the third radar to provide different elevation information (and a different perspective in general) relative to the other radars.

As such, the computing system can estimate the velocity vector further based on the third radial speed for the object obtained via the third radar. For instance, the computing system can transform the third radial speed into a third vector in the vehicle frame and then determine a given intersection point between a first plane extending orthogonal to the first vector in the vehicle frame, a second plane extending orthogonal to the second vector in the vehicle frame, and a third plane extending orthogonal to the third vector. The velocity vector can be estimated for the object based on the determined intersection point and a position of the object. For instance, the computing system can solve a three by three linear system set of equations generated based on the intersection point between the first plane, the second plane, and the third plane.

Multiple radars can offer many advantages over a single radar by enhancing the perceptual capabilities. By integrating multiple radar sensors positioned strategically on the vehicle, stereo radar provides a more holistic and detailed view of the surrounding environment, which can provide improved accuracy in detecting objects and enable better-informed decisions by vehicle systems. Stereo radars can perform better in adverse weather conditions, where optical sensors might falter, as stereo radar can maintain reliable tracking even in rain, fog, or snow.

Stereo radar can also provide accurate distance and velocity estimation for use by vehicle systems. In particular, the fusion of signals from different radar sensors enables the system to precisely determine the distance to surrounding objects and their relative velocities. With stereo radar, a vehicle can calculate safe following distances, anticipate potential collisions, and adjust speed in real time based on the surrounding environment. In addition, the integration of stereo radar can increase the robustness of object classification. By harnessing the diverse data captured by multiple radar channels, the radar system may gain a more detailed understanding of object shapes and motions, which can help when distinguishing between various types of objects, such as pedestrians, cyclists, and different classes of vehicles. In combination with other sensor modalities, stereo radar can contribute to a robust sensor fusion system operating onboard a vehicle.

In some examples, radars onboard a vehicle are used with control electronics, which can include one or more field-programmable gate arrays (FPGAs), ASICs, CPUs, GPUs, and/or TPUs. For instance, a radar unit can generate and receive complex signals that require significant processing. One or more control electronics can be programmed to implement various signal processing algorithms, such as filtering, modulation/demodulation, noise reduction, and digital beamforming. These operations help extract relevant information from the received radar signals, enhance signal quality, and improve target detection and tracking. In addition, radar systems often involve the conversion of analog signals to digital format for further processing. The control electronics can include analog-to-digital converters (ADCs) and digital-to-analog converters (DACs) to facilitate these conversions. The control electronics can receive analog signals from radar sensors, digitize them, and process the digital data for analysis and interpretation.

In addition, the control electronics can also provide the capability for real-time control and coordination of various radar system components. For instance, the control electronics can handle synchronization, timing generation, and system control, ensuring the proper timing and sequencing of operations within the radar system. This real-time control is crucial for accurate and synchronized signal transmission and reception. The control electronics can efficiently handle large amounts of data generated by the radar system. The control electronics can implement data storage, buffering, and data flow management techniques, enabling efficient data handling during signal transmission. This includes tasks such as data compression, data packetization, and data routing, ensuring smooth and reliable data transmission within the radar system. The control electronics can also integrate various interfaces and protocols required for radar signal transmission, such as processors, memory modules, communication modules, and display units. The control electronics can provide the necessary interface logic to facilitate seamless data exchange between these components, enabling efficient data flow and system integration. The control electronics can also be reconfigured and customized to meet specific radar system requirements and adapt to changing operational needs. This allows radar system designers to implement and optimize algorithms and functionalities specific to their application, resulting in enhanced performance and efficiency.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:

receiving, at a computing system, first radar data from a first radar and second radar data from a second radar, wherein the first radar and the second radar are coupled at different locations on a vehicle traveling in an environment;

determining a first radial speed for an object in the environment based on the first radar data and a second radial speed for the object based on the second radar data;

estimating, based on the first radial speed and the second radial speed, a velocity vector for the object relative to the vehicle;

generating radar imagery based on the first radar data and the second radar data, wherein a first channel of the radar imagery represents x-component velocity information of the estimated velocity vector on a per pixel basis and a second channel of the radar imagery represents y-component velocity information of the estimated velocity vector on the per pixel basis;

providing the radar imagery as an input into a neural network; and controlling the vehicle based on an output from the neural network.

2. The method of claim 1, further comprising:

transforming the first radial speed from a first frame corresponding to the first radar into a first vector in a vehicle frame corresponding to the vehicle; and transforming the second radial speed from a second frame corresponding to the second radar into a second vector in the vehicle frame.

3. The method of claim 2, wherein estimating the velocity vector for the object comprises:

determining an intersection point between a first line extending orthogonal to the first vector and a second line extending orthogonal to the second vector; and estimating the velocity vector for the object based on the determined intersection point and a position of the object.

4. The method of claim 3, further comprising:

receiving third radar data from a third radar, wherein the third radar is coupled to the vehicle at a third location that differs from locations of the first radar and the second radar;

determining a third radial speed for the object in the environment based on the third radar data; and wherein estimating the velocity vector for the object relative to the vehicle comprises:

estimating the velocity vector further based on the third radial speed for the object.

5. The method of claim 4, further comprising:

transforming the third radial speed into a third vector in the vehicle frame; and determining an intersection point between a first plane extending orthogonal to the first vector, a second plane extending orthogonal to the second vector, and a third plane extending orthogonal to the third vector; and estimating the velocity vector for the object based on the determined intersection point and a position of the object.

6. The method of claim 5, wherein determining the intersection point between the first plane, the second plane, and the third plane comprises:

solving a three by three linear system of equations generated based on the intersection point between the first plane, the second plane, and the third plane.

7. The method of claim 1, wherein controlling the vehicle based on the output from the neural network comprises:

controlling the vehicle based on object attributes output by the neural network for the object.

8. The method of claim 7, wherein the object attributes indicate one or more of a pose, a position, a type, and an intent for the object.

9. The method of claim 1, further comprising:

providing images from a camera in addition to the radar imagery as inputs into the neural network.

10. The method of claim 1, wherein the neural network is configured to initially track the object based on the radar imagery.

11. The method of claim 1, further comprising:

causing the first radar to transmit first radar signals into the environment based on a first waveform and a first pulse repetition frequency; and causing the second radar to transmit second radar signals into the environment based on a second waveform and a second pulse repetition frequency.

12. The method of claim 1, further comprising:

providing, based on the first radar data and the second radar data, a return intensity as a second input into the neural network.

13. The method of claim 12, wherein providing the return intensity as the second input into the neural network comprises:

determining a mean return intensity based on a first return intensity measured for the object in the first radar data and a second return intensity measured for the object in the second radar data; and providing the mean return intensity as the second input into the neural network.

14. The method of claim 12, wherein providing the return intensity as the second input into the neural network comprises:

comparing a first max return intensity measured for the object in the first radar data and a second max return intensity measured for the object in the second radar data;

determining that the first max return intensity is greater than the second max return intensity; and based on determining that the first max return intensity is greater than the second max return intensity, providing the first max return intensity as the second input into the neural network.

15. The method of claim 1, further comprising:

aligning pixels of a first radar image generated based on the first radar data and a second radar image generated based on the second radar data into a common coordinate frame using an extrinsic transform between the first radar and the second radar.

16. The method of claim 1, wherein the first radar and the second radar have partially overlapping fields of view, and wherein the radar imagery is 2-channel radar imagery.

17. The method of claim 1, wherein the neural network performs object detection based on the radar imagery without a Kalman filter.

18. A system comprising:

a vehicle;

a first radar and a second radar, wherein the first radar and the second radar are coupled at different locations on the vehicle;

a computing device configured to:

receive first radar data from a first radar and second radar data from a second radar;

determine a first radial speed for an object in an environment of the vehicle based on the first radar data and a second radial speed for the object based on the second radar data;

estimate, based on the first radial speed and the second radial speed, a velocity vector for the object relative to the vehicle;

generate radar imagery based on the first radar data and the second radar data, wherein a first channel of the radar imagery represents x-component velocity information of the estimated velocity vector on a per pixel basis and a second channel of the radar imagery represents y-component velocity information of the estimated velocity vector on the per pixel basis;

provide the radar imagery as an input into a neural network; and control the vehicle based on an output from the neural network.

19. The system of claim 18, wherein the neural network is configured to use lidar point cloud data and images as additional inputs.

20. A non-transitory computer-readable medium configured to store instructions, that when executed by a computing system, causes the computing system to perform operations comprising:

receiving first radar data from a first radar and second radar data from a second radar, wherein the first radar and the second radar are coupled at different locations on a vehicle traveling in an environment;

determining a first radial speed for an object in the environment based on the first radar data and a second radial speed for the object based on the second radar data;

estimating, based on the first radial speed and the second radial speed, a velocity vector for the object relative to the vehicle;

generating radar imagery based on the first radar data and the second radar data, wherein a first channel of the radar imagery represents x-component velocity information of the estimated velocity vector on a per pixel basis and a second channel of the radar imagery represents y-component velocity information of the estimated velocity vector on the per pixel basis;

providing the radar imagery as an input into a neural network; and controlling the vehicle based on an output from the neural network.

* * * * *